(12) United States Patent
Folsom et al.

(10) Patent No.: US 6,358,174 B1
(45) Date of Patent: Mar. 19, 2002

(54) HYDRAULIC MACHINE

(75) Inventors: Lawrence R. Folsom; Clive Tucker, both of Pittsfield, MA (US)

(73) Assignee: Folsom Technologies, Inc., Castleton, NY (US)

(*) Notice: Subject to any disclaimer, the term of this patent is extended or adjusted under 35 U.S.C. 154(b) by 0 days.

(21) Appl. No.: 09/554,471

(22) PCT Filed: Nov. 12, 1998

(86) PCT No.: PCT/US98/24053

§ 371 Date: May 11, 2000

§ 102(e) Date: May 11, 2000

(87) PCT Pub. No.: WO99/24738

PCT Pub. Date: May 20, 1999

Related U.S. Application Data

(60) Provisional application No. 60/065,377, filed on Nov. 12, 1997.

(51) Int. Cl.[7] ................................................ F16H 47/04
(52) U.S. Cl. ............................ 475/72; 475/73; 475/78; 475/83
(58) Field of Search ............................... 475/72, 83, 78, 475/73

(56) References Cited

U.S. PATENT DOCUMENTS

| | | | | |
|---|---|---|---|---|
| 3,982,448 A | * | 9/1976 | Polak et al. | 74/687 |
| 4,291,592 A | * | 9/1981 | Meyerle et al. | 74/687 |
| 4,353,269 A | * | 10/1982 | Hiersig | 74/682 |
| 5,785,623 A | * | 7/1998 | Iino et al. | 475/72 |
| 5,803,856 A | * | 9/1998 | Iino et al. | 475/72 |

FOREIGN PATENT DOCUMENTS

DE          3927783       * 2/1991 ................. 475/80

* cited by examiner

*Primary Examiner*—Charles A. Marmor
*Assistant Examiner*—Tisha D. Lewis
(74) *Attorney, Agent, or Firm*—J. Michael Neary

(57) ABSTRACT

A hydromechanical transmission has an operating assembly including an input hydrostatic unit (50) and an output hydrostatic unit (60), each having a rotating cylinder (180, 182) and piston element (210, 212) and a non-rotating yoke element (150, 151). The non-rotating elements are yoke elements (150, 151) linked together to react the separating forces internally, bypassing the housing (120).

31 Claims, 31 Drawing Sheets

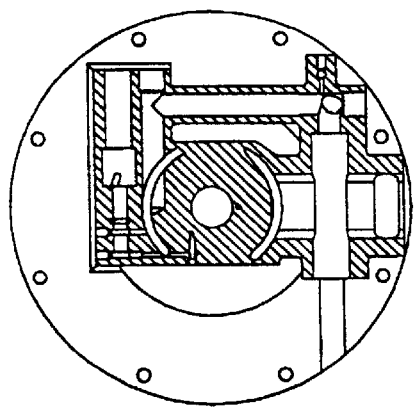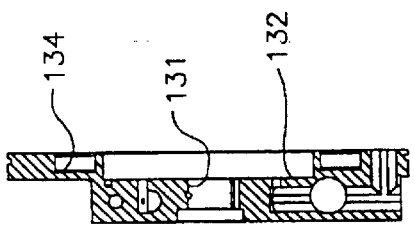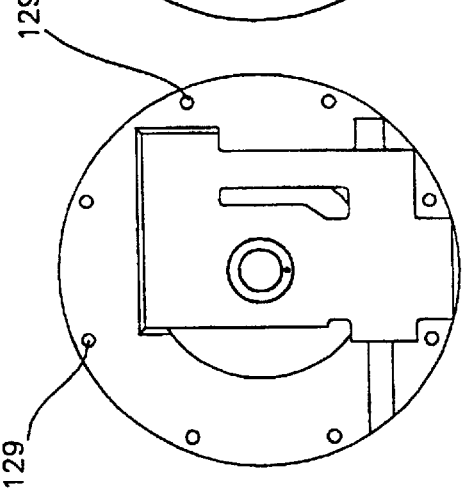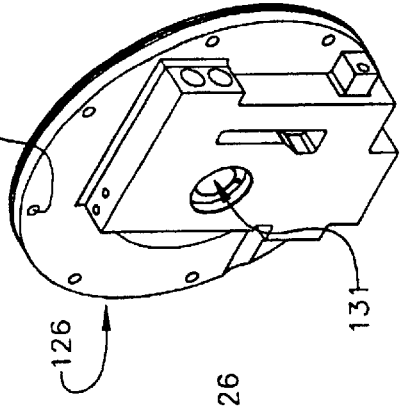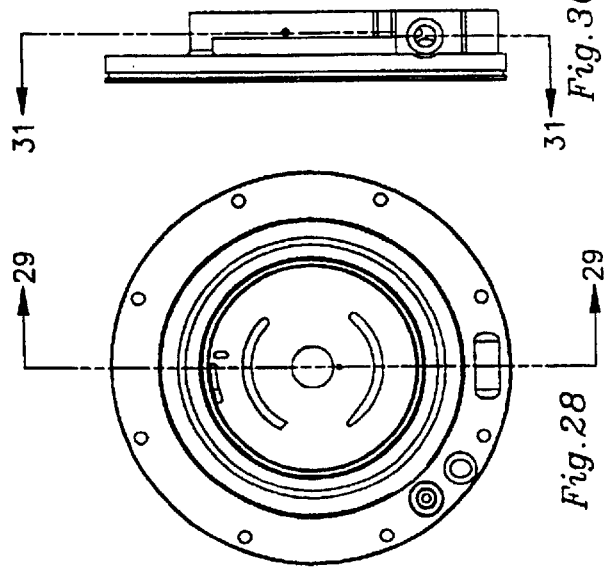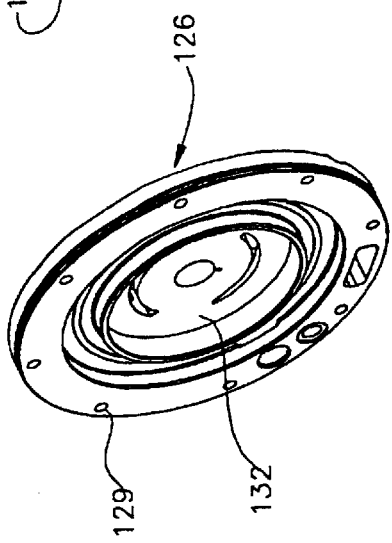

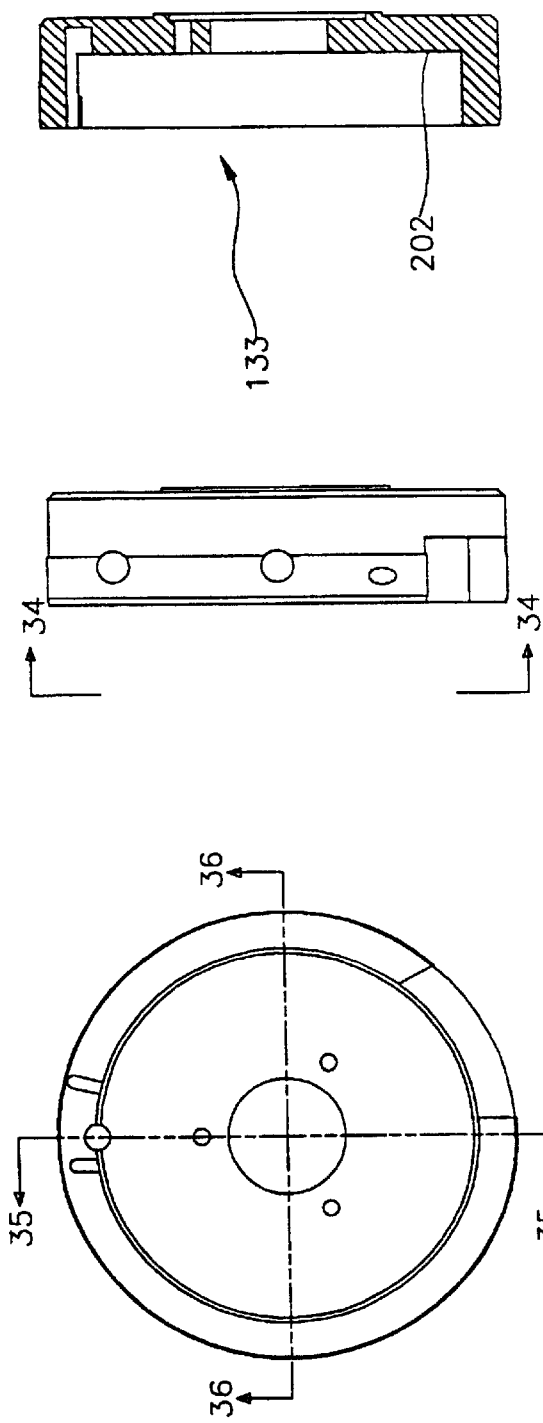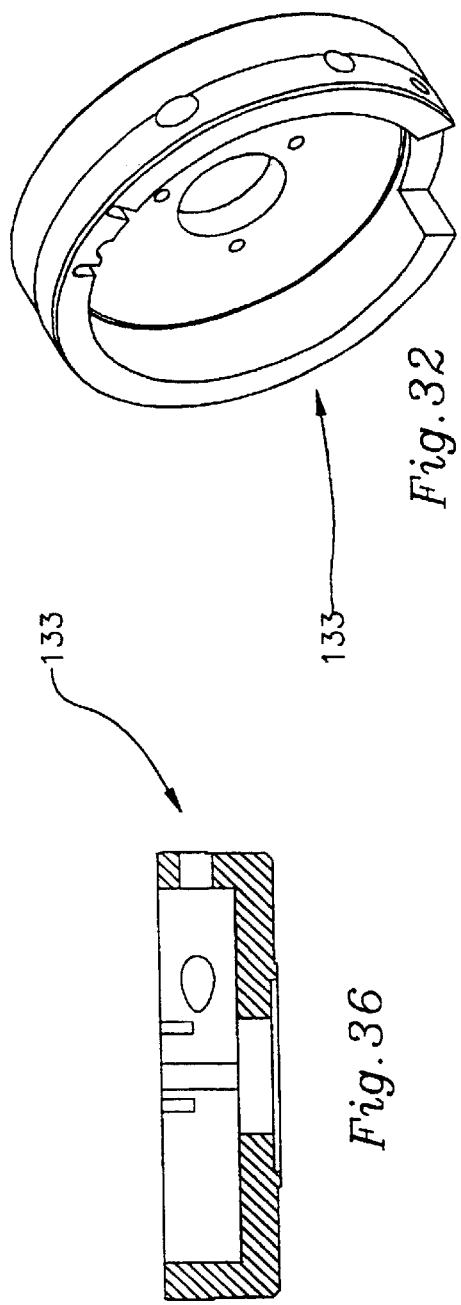

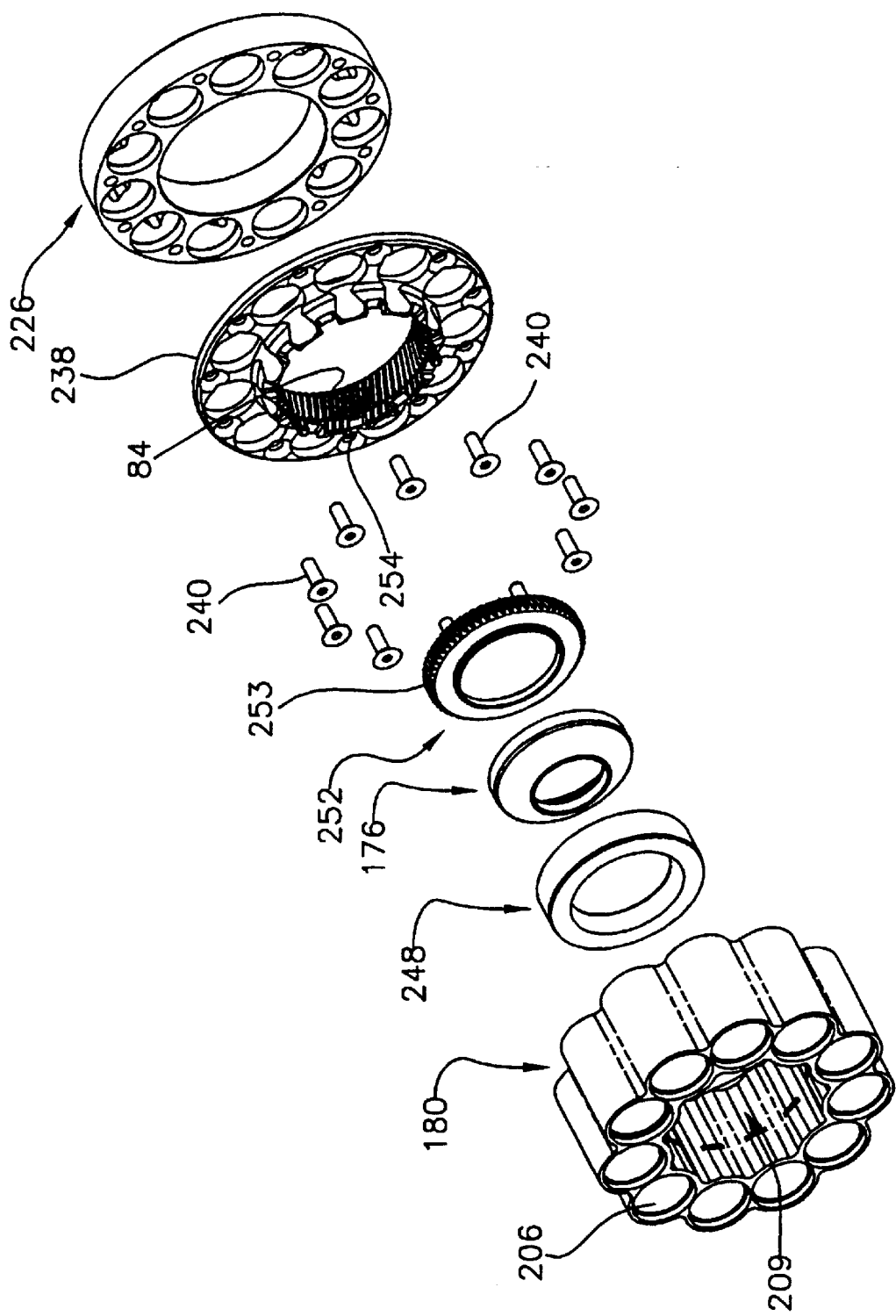

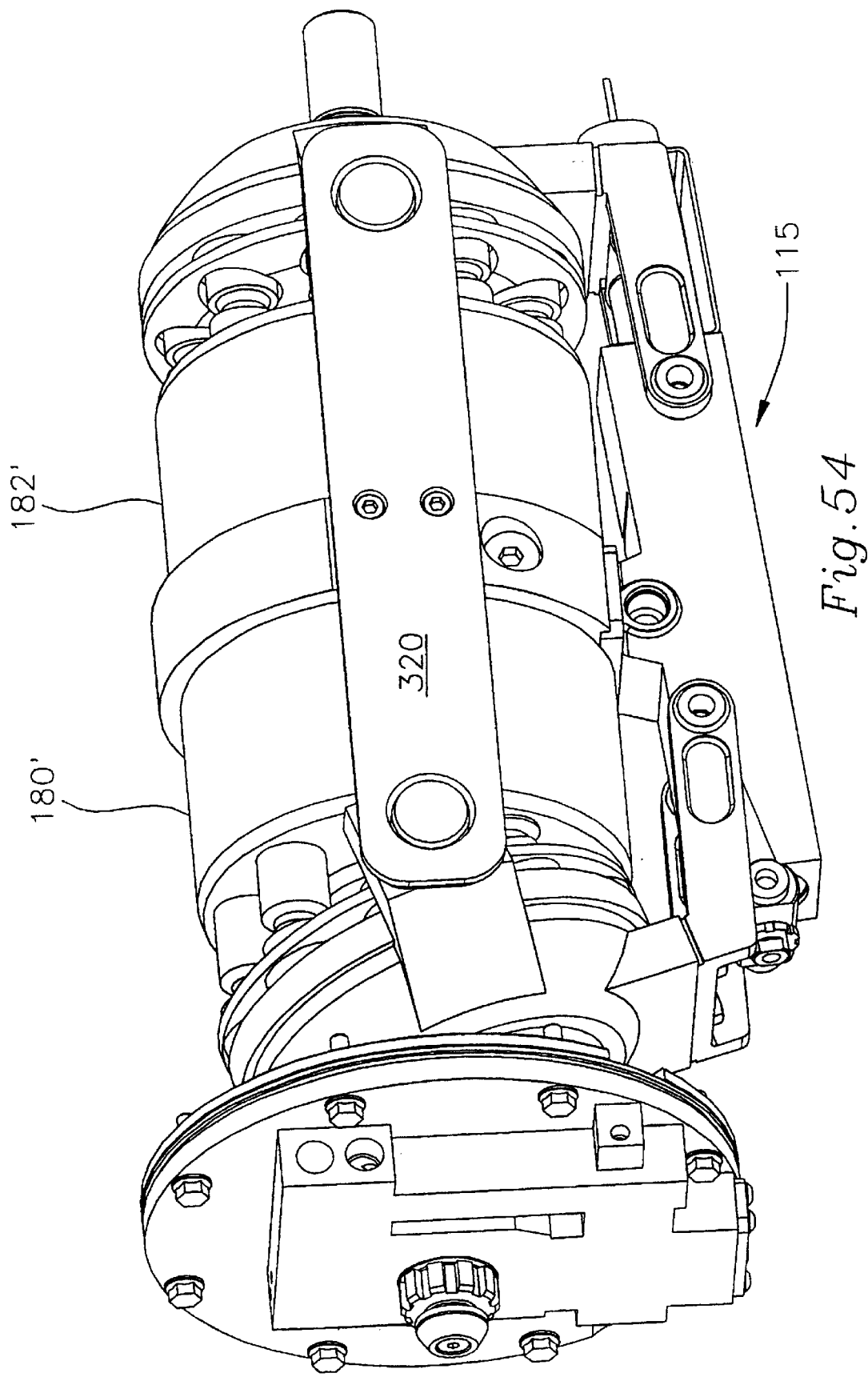

HYDRAULIC MACHINE

This relates to U.S. Provisional Application No. 60/065,377 filed on Nov. 12, 1997 and to international application No. PCT/US98/246053 filed on Nov. 12,1998.

This invention relates to hydromechanical transmissions, and more particularly to a hydromechanical transmission having rotating cylinder block hydrostatic units on each side of a grounded manifold and related through two planetary gear sets, and a simple clutch for selectively decoupling the pump from the input shaft, and to facilitate ease of external access to the fluid circuit without need of rotating fluid interfaces.

BACKGROUND OF THE INVENTION

Hydromechanical transmissions of many varieties have been conceived, although only a small number have actually been produced in commercial quantities. Many practical engineering problems must be addressed before a transmission would be considered acceptable for use in a production vehicle. One such problem is dynamic balancing of rotating components. In large machines with low input and output speeds, dynamic balancing is not a critical factor, but in modern passenger cars where the trend is toward higher engine speeds, dynamic balance becomes increasingly important since the unbalance forces are proportional to the square of the rotating velocity. Therefore, all serious engineering designs for such applications must provide for dynamic balance of rotating components, typically by some form of translating counterbalance mass. Complicating the issue, it may be difficult to design a system that is well balanced dynamically over its entire range of operating speeds. Thus, a hydromechanical transmission having components that are inherently dynamically balanced over their full range of operating speeds would be a significant improvement to the technology of hydromechanical transmissions.

The speed and torque range of the transmission must be tailored precisely to the requirements of the driven application and the capabilities of the driver. For example, modern passenger cars generally have an over-drive top gear with a ratio of approximately 0.7:1 and a low gear ratio of approximately 3:1 for a range spread of greater than 4:1. An ideal transmission would make it possible to cover this entire range without the need to shift gears, using hydraulic units large enough to develop the 3:1 low gear multiplication.

Conventional hydrostatic transmissions often include a rotating hydraulic interface by which make-up fluid can be injected into the fluid circuit to make up for fluid losses by leakage. Correct pressure balance is difficult to achieve in such hydraulic interfaces resulting in excessive drag or excessive fluid losses. Removal of such rotating interfaces would provide greatly enhanced efficiencies at final ratio.

The flow rate in conventional hydrostatic transmission is a source of fluid flow losses and noise. A hydromechanical transmission that greatly reduces the fluid flow rate compared to that in conventional hydrostatic CVT's would offer a significant advantage in efficiency and noise. In particular, if the flow rate at neutral and at final ratio can be reduced to zero regardless of power throughput, and if the maximum flow is only ⅓ that of conventional hydrostatic transmissions of the same displacement, that improvement would be very welcome in the industry.

Many varieties of positive displacement hydrostatic devices exist. Some, such as the vane or ball types offer low cost and/or high reliability at the trade-off of efficiency and/or performance. Ability to use any type of hydrostatic unit that suits the application would be a particular benefit to OEM customers of hydromechanical transmission so that they could tailor the cost and characteristics of the transmission to the application and their customers' requirements.

Applications for hydromechanical transmission range from large power plants on the order of railroad engines, marine engines and off road loaders and trucks, all the way down to snowmobiles, motorcycles, and even electric scooters. The flexibility to scale up or down to accept any power input and provide an over drive, under drive or 1:1 final ratio without additional external gearing and with any desired efficiency, durability and cost within the trade-off range, affords a manufacturer a simple and inexpensive technical approach to offer a wide range of hydromechanical transmissions in which the transmission design for each customer can easily and quickly be produced for the particular requirements of that customer's application.

A high input shaft speed often needs to be geared down to produce a moderate pump speed at an elevated torque to better match the input speed to the pump characteristics. Moreover, a clutch or brake mechanism that can be operated to smoothly decouple the input shaft from the pump would be a useful feature to reduce the start-up torque, eliminate lurching on start-up, and provide a soft "launch feel", that is, a smoothly operating, easily controlled acceleration from stand-still without lurching, jerking or lunging.

SUMMARY OF THE INVENTION

Accordingly, it is an object of this invention to provide an improved hydromechanical transmission that is simple in design and construction, and is inexpensive to produce, provides high operating efficiencies, and can operate smoothly at high speed substantially free of dynamic imbalance caused by rotating eccentric masses. Another object of the invention is to provide an improved hydromechanical transmission using hydrostatic components that are inherently balanced dynamically over their entire operating speed range. Still another object of the invention is to provide an improved hydromechanical transmission having internal gearing that reduces a high input shaft speed to a speed better suited to a hydraulic pump, and provides an overdrive capability to the wheels. Another still further object of the invention is to provide an improved hydromechanical transmission having an internal clutch mechanism for decoupling the input shaft from the pump to allow the transmission to free-wheel during start-up and other suitable times during operation of the vehicle. Another further object of this invention is to provide an improved hydromechanical transmission that has simple, reliable and leak-free fluid control connections to a stationary manifold block. Yet another object of this invention is to provide an improved hydromechanical transmission having a simple and reliable pump and motor stroke control using a pivoted yoke attached to ground.

These and other objects of the invention are attained in a continuously variable transmission having an operating assembly including an input hydrostatic unit driven by an input shaft, and an output hydrostatic unit hydraulically related to the input hydrostatic unit through a stationary manifold between rotating cylinder blocks of the two units. The input and output hydrostatic units are mechanically related to each other and to the input shaft and an output shaft through at least one variable ratio or epicyclic gearset such as a planetary gearset or differential gearset, all enclosed within a housing. A stationary actuator fixed to the housing is linked to the hydrostatic units for adjusting their displacement, and that actuator is controlled by a control mechanism that causes the actuator to shift to positions that produce the desired transmission ratio. A brake is interposed between two elements in the gearset for selectively and smoothly decoupling and recoupling the input hydrostatic unit from the input shaft to allow the transmission to free-wheel when the brake is operated.

BRIEF DESCRIPTION OF THE DRAWINGS

The invention and its many attendant objects and vantages will become better understood upon reading the following description of the preferred embodiment in conjunction with the following drawings, wherein:

FIGS. 25–31 are various views of the input end closure shown in FIGS. 6 and 10–13;

FIGS. 32–36 are various views of the make-up pump housing shown in FIGS. 10–13;

FIG. 46A is an exploded perspective view of selected pump guidance and preload components shown in FIGS. 10–13;

FIG. 54 is a perspective view from the side of a swashplate version of the invention.

DESCRIPTION OF THE PREFERRED EMBODIMENT

Figure 1:
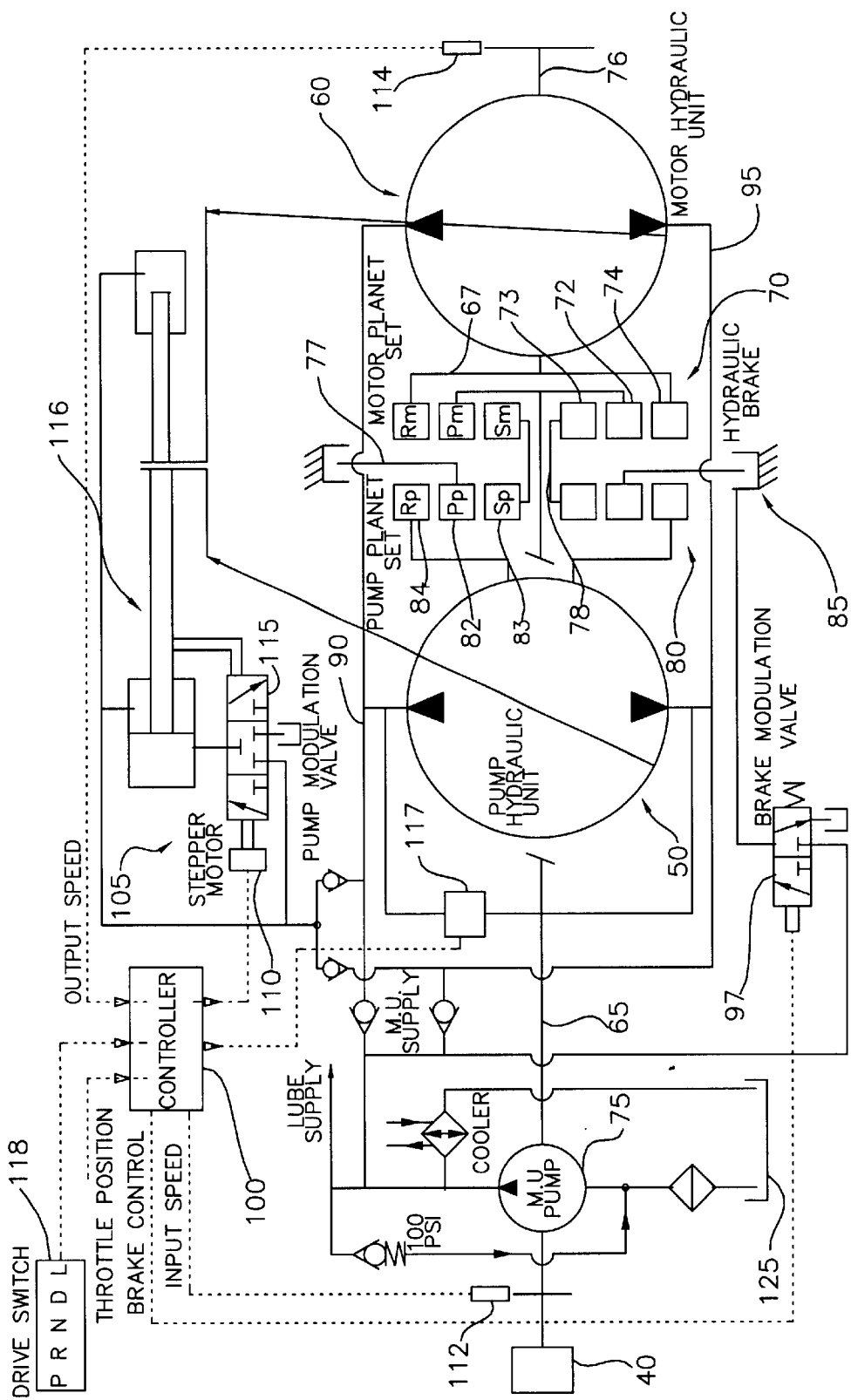
FIG. 1 is a schematic diagram of a preferred embodiment of a hydromechanical transmission in accordance with this invention.

Turning now to the drawings, wherein like reference characters designate identical or corresponding parts, and more particularly to FIG. 1 thereof, the invention is illustrated in a schematic diagram in its preferred embodiment as a serial, continuously variable, double planetary design. It is specifically intended for use in most bus, truck and automobile applications powered by diesel and gasoline internal combustion engines 40 where an overdrive final ratio is specified, although it would be useful in many other applications as well. The transmission is shown in FIG. 1 at hydraulic lock-up, with an input hydrostatic unit, or pump 50, at maximum displacement and the output hydrostatic unit, or motor 60, at zero displacement. The pump 50 has a non-rotating element and a rotating element driven by input torque delivered from an input shaft 65, and is effective to pressurize a working fluid such as hydraulic fluid. The motor 60 produces output torque delivered to an output shaft 76 when the motor is energized by the pressurized fluid from the pump 50. The two hydrostatic units can be simultaneously controlled from a master controller 100, or they can be independently controlled, as described in detail below.

Figure 2:
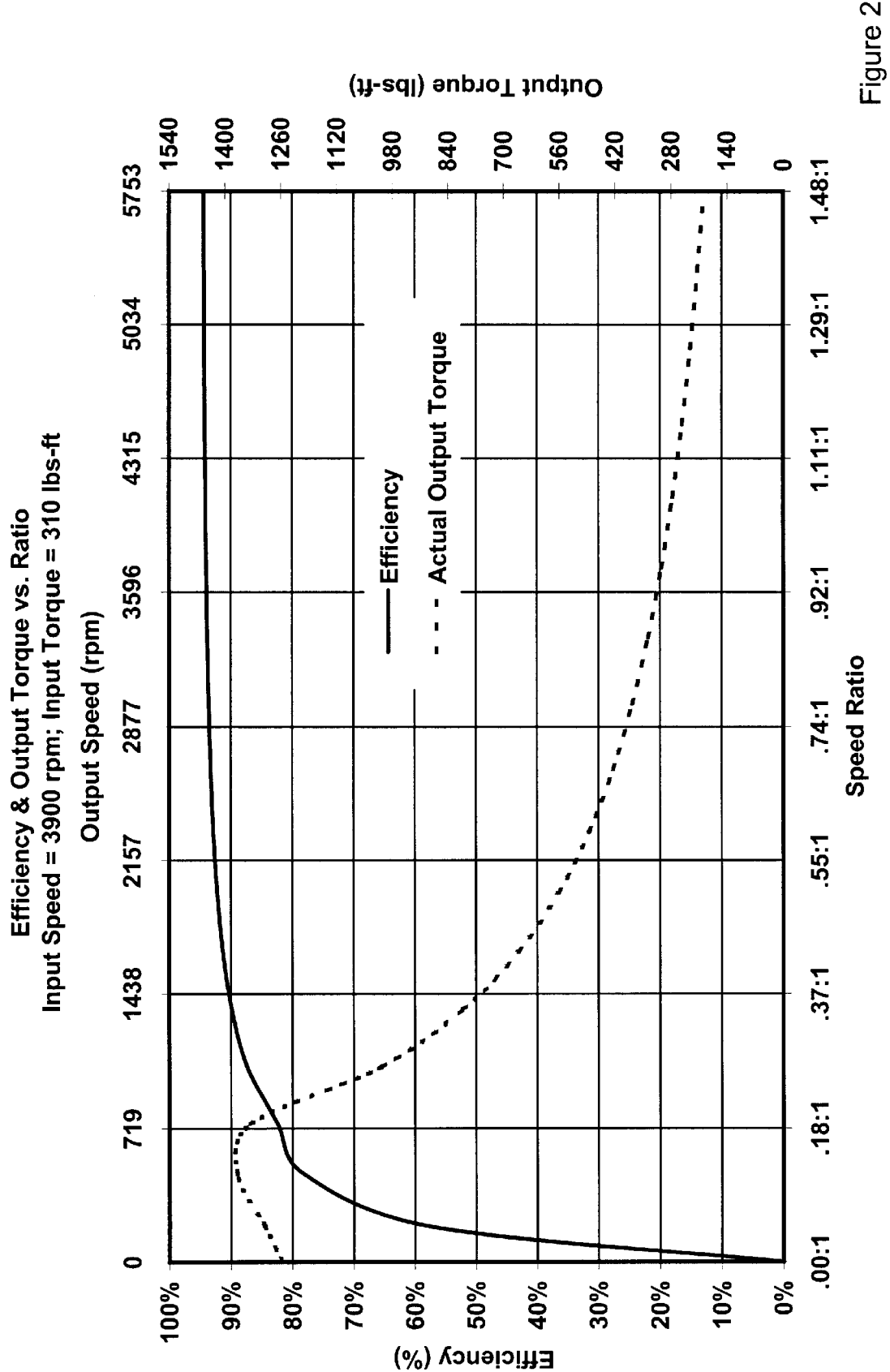
FIG. 2 is a graph showing efficiency and output torque as a function of the speed ratio and output speed of the hydromechanical transmission shown in FIGS. 1 and 6–13.

Rotary power from the engine 40 is delivered, typically directly from the engine crankshaft to a drive coupling 64 at the input end of the input shaft 65 of the transmission at the speed and torque of the engine 40, which can be operated at its optimum operating point for optimal efficiency and emissions. The transmission has a continuously variable ratio that enables it to convert the rotary input power from the engine 40 to rotary output power to the vehicle drive shaft at any desired speed within a range from reverse, through zero, to an overdrive speed, for example 1.5 times engine speed, and at a corresponding torque, with an overall efficiency of about 90% or higher, as shown in FIG. 2.

Input torque from the engine 40 is transmitted through the input shaft 65 to a planet carrier 67 of a motor planet gear set 70 having planet gears 72 mounted in the planet carrier 67 and engaged with an inner sun gear 73 and an outer ring gear 74. The input shaft 65 also drives a makeup pump 75 mounted in a front end closure of the transmission case. The ring gear 74 of the motor planet set 70 is connected drivingly to the motor 60 and to an output shaft 76. A torque tube 78 connects the sun gear 73 of the motor planet 70 set to a sun gear 83 of a pump planet set 80. The pump planet gear set has a pump planet carrier 77 in which are mounted pump planet gears 82 that are engaged with the inner pump sun gear 83 and an outer pump ring gear 84. The ring gear 84 of the pump planet set 80 is connected drivingly to the pump 50. The planet carrier 77 of the pump planet set 80 can be grounded to the transmission case via a releasable brake 85.

In operation, when the transmission is in neutral, the motor 60 is at a large displacement and the pump 50 is at zero displacement. In this neutral condition, rotation of the pump does not result in pressurized fluid being conveyed to the motor 60, and no reaction torque is transmitted to the motor ring gear 74 and coupled output shaft 76, hence, no output torque is delivered to the output shaft. The output shaft 76 is stationary, hence the motor 60 and motor planet set ring gear 74 are also stationary. The planet carrier 67 of the motor planet set 70 is spinning at input speed and therefore the sun gear 73 of the motor planet set 70 (and hence the sun gear 83 of the pump planet set 80) is rotating at $1+(Rm/Sm)$ multiplied by the input speed, where Rm is the number of teeth in the motor set ring gear 74 and Sm is the number of teeth in the motor set sun gear 73. For example if the motor set ring gear 74 has 64 teeth and the motor set sun gear 73 has 32 teeth, the sun gears 73 and 83 will be rotating at $1+(64/32)=3$ times input speed. With the pump planet carrier 77 fixed to ground via the brake 77, the ring gear 84 of the pump planet set 80 (hence the pump 50) is driven to rotate at a speed equal to the speed of the sun gears 73 and 83 multiplied by $(Sp/Rp)$ in the opposite direction, where Sp is the number of teeth on the pump set sun gear 83 and Rp is the number of teeth on the pump set ring gear. For example, if the pump set sun gear 83 has 24 teeth and the pump set ring gear 84 has 64 teeth, the pump set ring gear 84 and hence the pump will be rotating at sun gear speed multiplied by—$(24/64)$, or 9/8 input speed in the opposite direction from input. Since the pump is at zero displacement, there is no pumping and therefore no reaction torque can be generated at the pump. Hence it rotates freely and the transmission output speed is zero.

In actual operation, the brake 85 will be released before the engine is turned on, disengaging the pump planet carrier 77 of the pump planet set 80 from ground, so the planet carrier 77 can rotate freely. Therefore, no torque can be transmitted from the sun gear 83 to the pump 50. Without reaction torque transmitted back through the sun gears 83/73, no reaction torque can be transmitted from the input shaft 65 to the output shaft 76, even if the pump is at some displacement when the engine 40 is first turned on. The brake 85 will not be applied until the control has moved the pump to zero displacement, as verified via a sensor signal to the controller 100.

Figure 3:
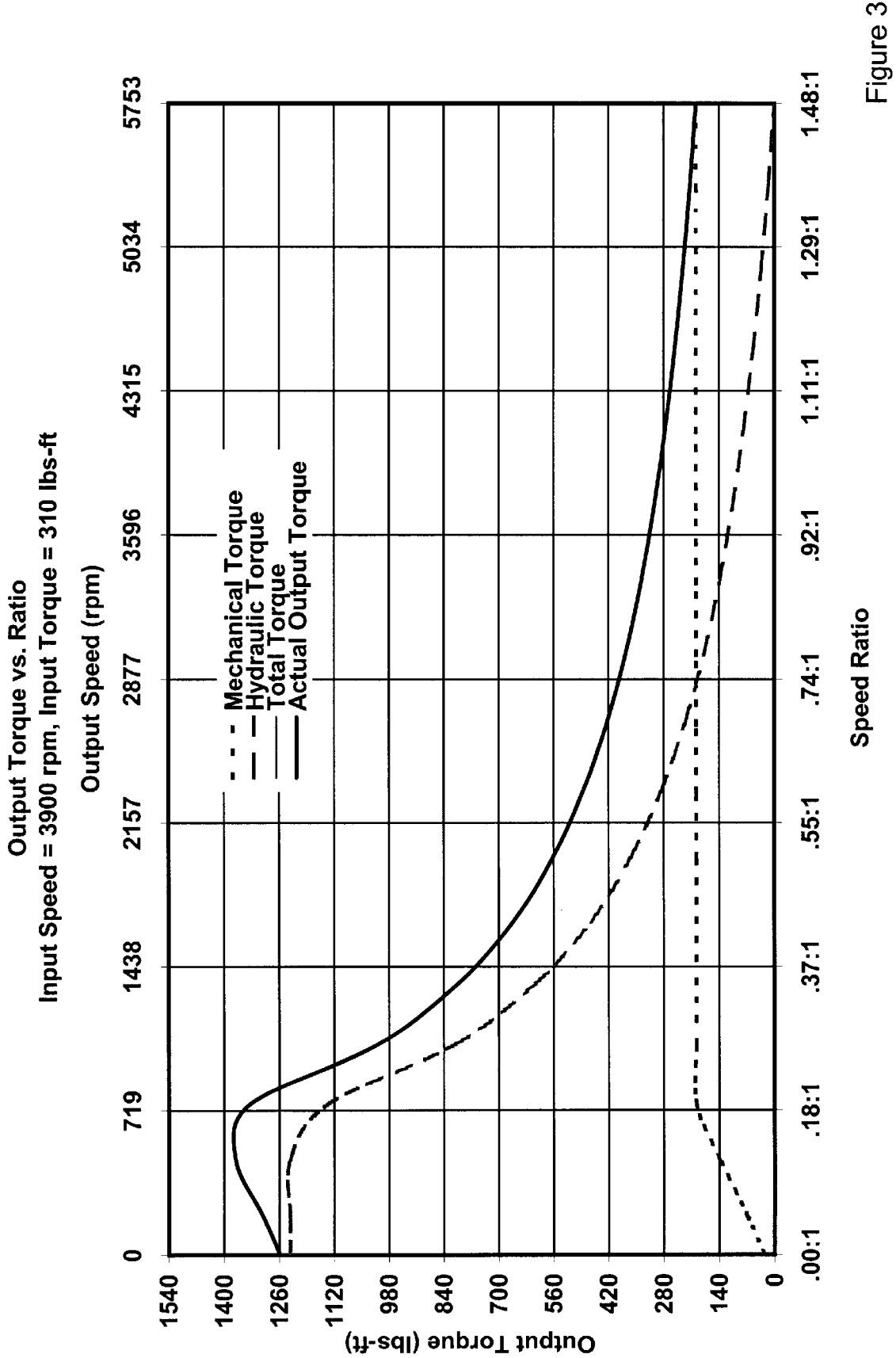
FIG. 3 is a graph showing output torque as a function of the speed ratio of the transmission shown in FIGS. 1 and 6–13.

Due to the two planet set configurations, the input torque is split into two parallel paths, as shown in FIG. 3. The first path is a direct mechanical path fed continually to the output shaft at the ratio of input torque multiplied by the inverse of 1+the ratio of teeth on the motor set sun gear 73 and the motor set ring gear 74, or $(1/(1+(Sm/Rm)))$. The second path is a mechanical path fed continually to the pump 50 at a torque equal to the input torque multiplied by the inverse of 1+the product of the ratios of the numbers of teeth on the motor set ring gear 74 to the sun gear 73, and the numbers of teeth on the pump set ring gear 84 to the sun gear 83, or $(1/(1+(Rm/Sm))\times Rp/Sp)$.

Figure 4:
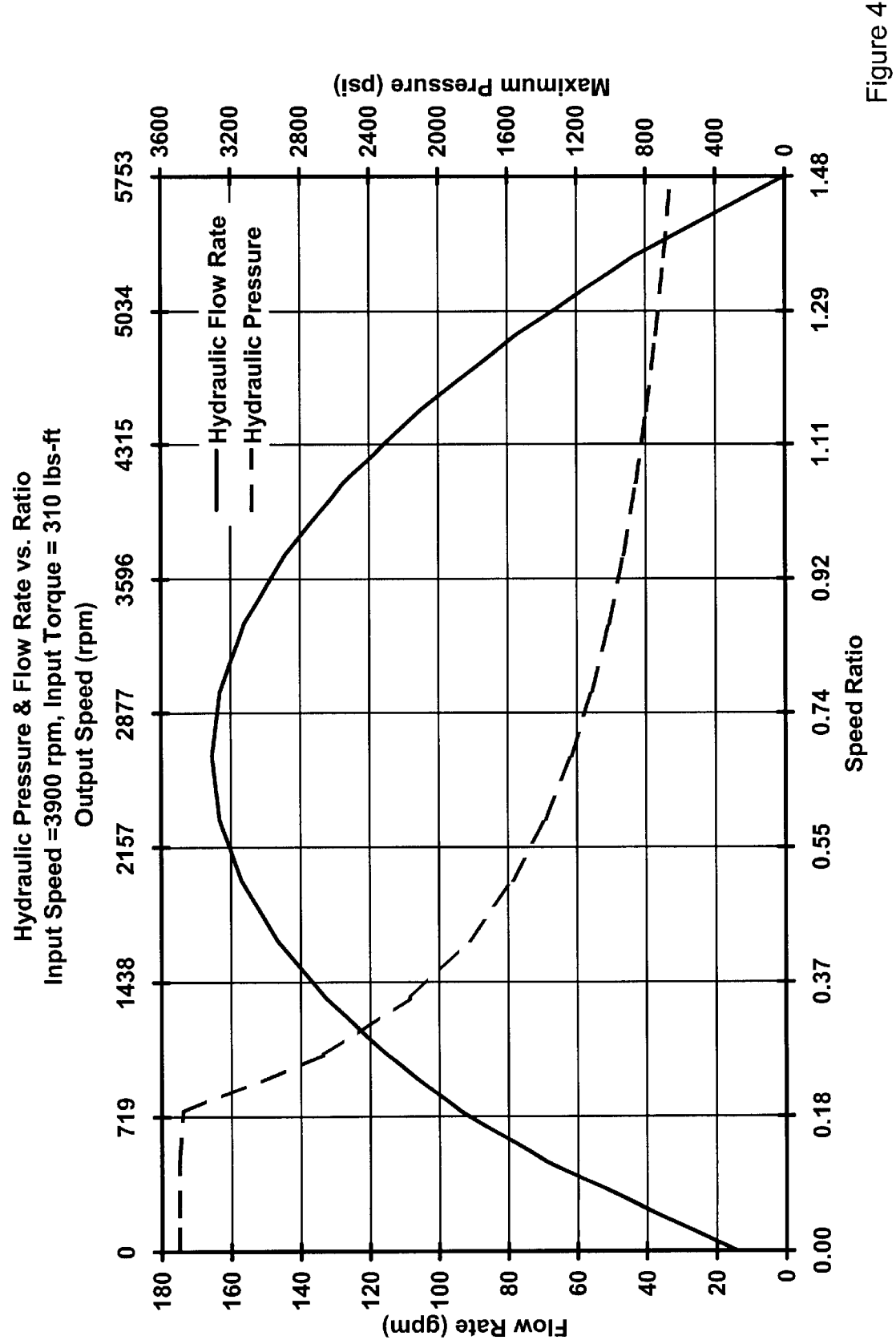
FIG. 4 is a graph showing the hydraulic pressure and flow rate as a function of the speed ratio and output speed of the transmission shown in FIGS. 1 and 6–13.

With the brake 85 applied, grounding the pump gear set planet carrier 77 to the housing, the pump 50 is stroked from zero displacement to give a small displacement. The pump 50 is rotated by the input shaft 65, acting through the two planetary gear sets 70 and 80, at input speed multiplied by $(1+(Rm/Sm))\times(Sp/Rp)$ to begin pumping. Fluid displaced by the pump flows directly through flow channels 90 or 95 and drives the motor to produce output torque in the output shaft 76 for delivery through an output drive connection 96 on the output shaft 76 to a drive shaft of the vehicle. Since the pump 50 is at a small displacement, a small amount of torque to the pump 50 results in a high pressure and small flow rate, as shown in FIG. 4. Since the motor 60 is at a large displacement the high pressure and small flow rate from the pump 50 results in a high output torque and low output speed, as shown in FIG. 3. This high 'hydraulic' output torque is added directly to the mechanical output torque as described above. Therefore the total output torque can be expressed as:

Output torque=input torque×$[1/(1+(Sm/Rm))+1/(1+(Rm/Sm))\times Rp/Sp\times$motor displacement/pump displacement]

It can therefore be seen, as illustrated in FIG. 3, that there is a total output torque comprising a fixed mechanical torque plus a variable hydraulic torque, and as the ratio of motor displacement to pump displacement decreases, the amount of hydraulic torque decreases. If the motor displacement is adjusted to zero then the hydraulic torque component becomes zero and the mechanical torque component becomes 100%.

As the displacement of the pump 50 increases, the flow rate from the pump 50 increases, and this increased flow causes the motor 60 and hence the motor planet gear set ring gear 74 and the output shaft 76 to increase in speed. As the motor planet set ring gear 74 increases in speed relative to the input shaft speed and hence the speed of the motor planet set planet carrier 67, the speed of the motor planet set sun gear 73 decreases, causing the pump speed to decrease, as illustrated in FIG. 4. This has the effect of reducing the total system flow rate to a fraction of the flow rate in to a conventional hydrostatic transmission of the same capacity. The reduction will depend on the planet set ratios used; in this embodiment, the flow rate reduction is to approximately ⅓ to ⅕. This flow rate reduction reduces the flow losses and noise levels normally associated with hydrostatic machines.

As the motor displacement approaches zero and the pump displacement approaches its maximum, the pump speed approaches zero and motor speed approaches its maximum. When the motor 60 reaches zero displacement, it can no longer accept fluid flow from the pump 50, so the pump 50 can no longer displace fluid and therefore stops rotating. This causes the sun gear 83 of the pump planet set 80,and hence the sun gear 73 of the motor planet set 70, to stop rotating. The pump 50 now acts as a reaction unit for the sun gear 73 of the motor planet set 70. In this case, all the input torque now transfers through the motor planet set 70 to the output shaft 76. Due to the ratio of the sun gear 73 to the ring gear 74 of the motor planet set 70, the output speed increases and the output torque decreases (e.g. by a factor of 1.5 to give an overdrive ratio of 0.667:1, as in the illustrated example). Since the pump 50 has been stroked to its full displacement, hydraulic pressure required to react the input torque is reduced to a minimum, as shown in FIG. 4, thus reducing to a minimum the hydraulic leakage losses and hydraulic loading of bearings.

Figure 5:
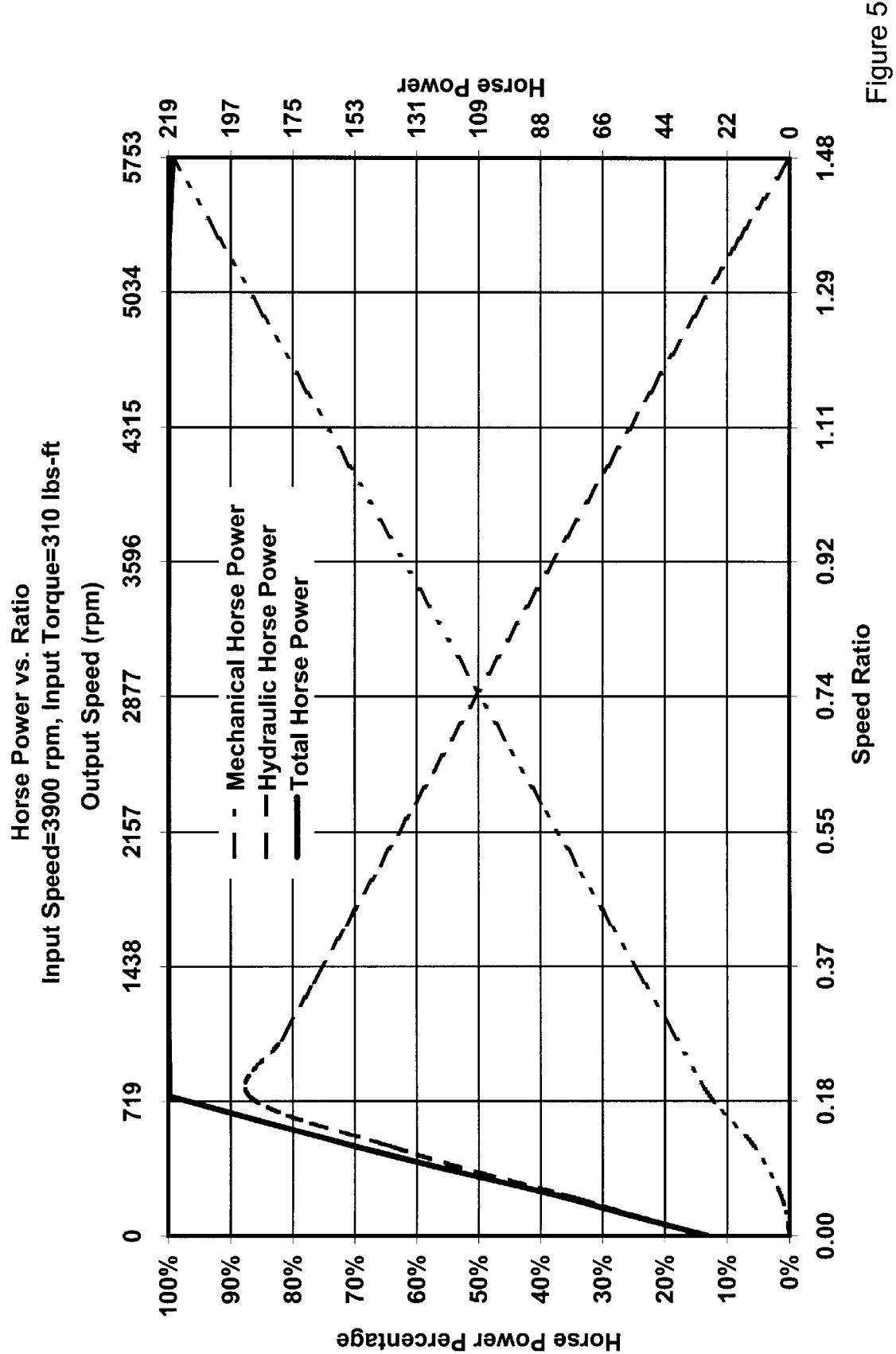
FIG. 5 is a graph showing the components of output horsepower contributed mechanically and hydraulically by the transmission shown in FIGS. 1 and 6–13.

With all the power now transferring through the motor planet set, as illustrated in FIG. 5, and the hydraulics acting only as a reaction unit to hold the motor planet set sun gear, the efficiency will be very high (95+%) as illustrated in FIG. 2, since the only losses are the normal gearset losses (approx. 2%), slippage on the pump 50 due to leakage, and windage losses on the motor 60 due to the fact it is spinning at output speed under some pressure. To further increase the efficiency at this point a brake could be applied to lock the pump 50 to ground. This will help in two ways: first it will stop the pump 50 from slipping due to hydraulic leakage, and second, it will reduce the hydraulic system pressure to makeup pressure, therefore reducing the load and hence windage loss of the motor. The pump brake could be actuated by makeup pressure or by electromechanical means.

The transmission can drive the output shaft 76 in reverse. Starting from the same conditions as in neutral, with the motor at maximum displacement and the pump at zero displacement, the controller strokes the pump in the opposite direction (i.e. a negative angle) causing fluid to flow in the opposite direction. This will cause the motor 60 to exert torque on the output shaft 76 to rotate in the reverse direction. Due to the planet set gear configuration, the mechanical torque, as described above, is still acting in the forward direction. Therefore the total output torque, in reverse, can be expressed as:

output torque=input torque×[1/(1+($Sm/Rm$))−1/(1+($Rm/Sm$))×$Rp$/$Sp$×motor disp/pump disp]

A double planetary system (a motor planet set and a pump planet set) in a hydromechanical transmission has numerous benefits over a single planet set, including the following:

1. The motor planet set can be configured to give the desired final ratio of the transmission, and hence the ratio of mechanical torque transferred directly to the output shaft. In truck and automotive applications this is often an overdrive ratio in the range of 0.9:1 to 0.5:1. To configure a single planet set to give these final ratios causes the sun gear to rotate at relatively high speeds when the transmission is at very low ratios. If the pump were to be connected directly to this sun gear spinning at high speed, the high speed rotation of the pump could cause problems with centrifugal loading and noise, etc. By connecting the pump to a secondary planet set as described above, the pump speed is reduced, bringing it to within normal operating speeds.

2. By connecting the pump 50 to a secondary planet set 80 as described above, the pump rotation is reversed from that of the motor rotation. Keeping the high and low pressure flow passages directly inline with each other between the pump 50 and motor 60 enables the controls of both the pump and motor to stroke in the same direction, causing one to go to minimum displacement as the other goes to maximum displacement. This simplifies the control to some extent, as only one actuator is required to control both the pump and motor. This operation will be described later in conjunction with FIGS. 6–15.

3. The secondary planet set (the pump planet set 80) has a grounded member, such as the planet carrier 77 of the pump planet set 80, that can be grounded by the releasable brake 85. Releasing the brake frees the planet carrier 77 from ground, thus enabling the grounded member to rotate so that no input torque can be reacted to output torque. This decoupling from ground of the grounded member can be useful in three operations:

a. When the brake 85 is released at initial start up, no torque is transmitted to the pump 50 so it will not rotate. If the pump 50 has shifted away from zero displacement during rest, the vehicle will not lurch forward or backward when the engine is turned on so long as the brake 85 is released. The brake will be applied only when the controller receives a signal from a sensor that the pump 50 and motor 60 are at their correct displacements. Also, delaying the beginning of pump rotation allows time for make-up pressure and lubrication to reach the hydraulic units and their bearing interfaces before they start to rotate.

b. As the pump is stroked to give some displacement and hence some output speed, the brake 85 can be modulated by means of a brake modulation valve 97 (described below) to give some slip to allow for a smooth start or "launch feel", in the same manner in which a clutch is slipped in a conventional manual transmission during acceleration from stop, or "take off". This eliminates the jerking or lurching "kangaroo" takeoffs common with prior hydrostatic transmissions.

c. The brake can be released under driving conditions to decouple the engine from the drive wheels if so required during an emergency such as an engine seizure etc., or during towing.

The transmission is controlled by means of the electronic control unit 100. The electronic control unit 100 receives several electronic signals from the engine, transmission and vehicle, as shown in FIG. 1. The electronic control unit 100 processes these signals using a computer algorithm, specific to each particular vehicle, to produce a control signal which it sends to a transmission ratio control unit 105 having electro-hydraulic devices, such as a servomotor or stepper motor 110 operating a pump modulation valve 115, and a control cylinder 116 by which the output ratio and speed of the transmission are controlled. This method of control offers great flexibility and enables the transmission to select the optimum ratio to achieve maximum system performance under a variety of operating conditions.

Depending upon the level of sophistication (and cost) of the control, it is possible to make the transmission behave in an adaptive, transparent manner, by reading many vehicle sensors such as applied brake force, steering angle, engine torque, rate of change of throttle position as well as throttle position etc. It is also possible to add manual features allowing the operator to select certain ratios.

In this description it is assumed that the level of sophistication of control is such as to enable an efficient ratio selection to obtain high system performance and economy whilst maintaining the required level of safety and reliability. The electronic control unit 100 receives signals from the drive switch 118, throttle position sensor, input speed sensor 112, output speed sensor 114, and other sensors selected by the vehicle manufacturer, depending on the desired control sophistication. It processes these input signals and sends signals to the brake modulation valve 97 and the stepper motor 110 for controlling the pump modulation valve 115 by which the control valve 116 is operated to control the displacement of the pump 50 and the motor 60.

A mechanical safety interlock may be incorporated into the drive switch 118 so that park, reverse and drive can only be selected when the vehicle is stopped or the brakes are applied, and the vehicle may only be started when the vehicle is in park, as in current automatic transmissions.

With the engine and electrical power off, the hydraulic brake 85 that grounds the pump planet carrier 77 is released, allowing the pump planet carrier 77 to spin freely when torque is applied to the sun gear 83 of the pump planet set 80. Therefore any engine rotation will just rotate the pump planet carrier 77 and transmit no torque to the output shaft 76.

The engine is started with the transmission in park. The controller 100 receives a signal from a contact in the drive selector switch 118 when the engine ignition switch is operated which signals the controller 100 to de-energize or release the brake 85, which allows the engine crankshaft to rotate without driving the pump 50. The electronic control unit 100 also sends a signal to the stepper motor 110 to send the transmission to the neutral position, just in case the vehicle was stopped with the transmission in a ratio other than neutral. When the engine 40 is at idle speed the make up pump 75 produces enough pressure and flow to ensure that the hydraulic units 50 and 60 have stroked to their neutral position, and pressure is available to energize the hydraulic brake 85 by way of the brake modulation valve 97, and to sufficient lubrication pressure and flow or prevent damage to moving parts.

Position sensors are attached to the non-rotating elements of the hydraulic units to generate signals that are transmitted to the electronic control unit 100 that the transmission is in neutral (i.e. pump at zero displacement, motor at maximum displacement), thus adding another level of control, safety, and reliability.

With the engine 40 at idle and the foot brake applied, the drive selector switch 118 is moved to the "drive" mode. When the foot brake is released and the throttle is depressed the electronic control unit 100 signals the brake modulation valve 97 to gradually apply the hydraulic brake 85 while also signaling the stepper motor 110 of the transmission ration controller 105 to stroke the transmission to some forward ratio. The electronic control unit 100 can determine the required "take off" characteristic of the vehicle, i.e. whether acceleration is to be slow and soft, hard and fast, or high torque (as in towing) from the rate of depression or force on the accelerator pedal and the load or resisting torque in the output shaft 76. The desired "take-off" is achieved by the rate of application of the brake 85 and the rate of change of the speed ratio produced by the stepper motor 110. By modulating the brake modulation valve 97, all various kinds of launch characteristics can be achieved.

When the output speed sensor 114 registers a certain speed, the electronic control unit 100 signals the brake modulation valve 97 to apply full brake force and fully lock the pump planet carrier 77. The stepper motor 110 alone now controls all transmission ratios.

By monitoring the throttle position, engine speed and the load applied to the engine, the electronic control unit 100 can produce the required vehicle speed requested by the operator. By comparing these values to a pre-programmed operating schedule the electronic control unit 100 can vary the transmission ratio (via the stepper motor 110) to achieve the most effective driving regime. By comparing the input to output speed signals the electronic control unit 100 can determine the transmission ratio and make continual changes to the stepper motor 110 to achieve this regime. It is also possible to add a driving style switch, such as sport or economy mode, to enable the electronic control unit 100 to read different operating schedules and therefore give different driving conditions as requested by the operator, enabling the electronic control unit 100 to select the most efficient ratio for greatest economy, or achieving the highest performance for acceleration etc.

As the vehicle is slowed down to a stop by the operator, the transmission is stroked by the electronic control unit 100 towards neutral. At the point when the transmission is in neutral, the output shaft becomes hydraulically locked, thus locking the driving wheels of the vehicle. This could cause some slight skidding of the tires at this point, which would be undesirable. To alleviate this condition, a small dump (short circuit) valve 117 may be inserted between the high-pressure and low-pressure lines 90 and 95 of the hydraulic units 50 and 60, allowing the hydraulic motor 60 to 'freewheel'. The dump valve 117 can be operated electronically and actuated by the electronic control unit 100 just before the neutral position is achieved. Although the motor will be very close to its maximum displacement at this time, the dump valve 117 need only accept a small flow rate as the motor speed will be virtually zero at this point. Once the vehicle is stopped the electronic control unit 100 can close the dump valve 117 and return the transmission to its 'holding neutral' position.

When the output speed approaches zero speed the electronic control unit 100 may be programmed to de-energize the brake modulation valve 97 therefore releasing the pump planet carrier 77. Although this is not necessary for the transmission to stay in the neutral mode, it readies the transmission for the next launch.

As mentioned earlier, the level of sophistication of control can be increased by using the variety of now common vehicle sensors, and more complex computer algorithms to achieve an adaptive transmission control, monitoring the driver's inputs and continually updating the operating schedules.

It is possible for the electronic control unit 100 to perform system diagnostic checks, by comparing the feedback signal from the servomotor or stepper motor 110 and actual ratio achieved and/or by measuring system and make up pressures and alerting the driver if these values fall beyond predetermined specifications.

Under certain circumstances, such as driving on gravel or icy roads or going down steep hills, and for maneuvering whilst towing heavy loads, it may be desirable for safety and enhanced control reasons to limit the maximum ratio that the electronic control unit 100 can select. For this reason, a low gear position is provided on the drive selector switch 118. This low gear mode can be activated either from a stationary start or on the fly from the drive mode. If low gear is selected from the park position, the transmission will start in the same manner as in drive mode, except that the transmission will not stroke beyond a predetermined ratio, staying at this lower maximum ratio if the throttle position is sufficiently depressed. The electronic control unit 100 will also use a different operating schedule to determine the transmission ratio, as starting in low gear will signify that a low speed, high torque demand is required, as in towing and maneuvering a heavy object. Also when driving in the low gear, due to the fact that a low ratio will be maintained, the driver will be offered more control from the throttle and more responsive engine braking at the expense of vehicle speed. This is particularly useful when towing heavy loads up and down hills.

If the low gear is selected whilst the vehicle is in motion and in the drive mode, low gear operation will take effect only when the vehicle is moving slower than a predetermined speed. At that speed, the electronic control unit 100 will then change the transmission ratio smoothly and slowly to suit the different operating schedules. The transmission will then operate as indicated above. If the transmission is placed into drive mode from low gear, the electronic control unit 100 will change the transmission ratio smoothly and slowly to suit the new operating schedule.

If the neutral mode is engaged on the drive selector switch 118, the electronic control unit 100 will assume that the vehicle needs to coast or be free-wheeled. To achieve this, the electronic control unit 100 will move the brake modulation valve 97 to release the brake 85 and disconnect engine power from the output shaft 76, and will stroke the transmission to full overdrive, (i.e. motor at zero displacement and pump at maximum displacement). This will enable the output shaft to rotate freely without any hydraulic pumping, causing the now released pump planet carrier 77 to rotate freely so that the vehicle can be externally maneuvered or towed.

In the event of a power failure or failure of the electronic control unit 100 when the transmission is not in overdrive, a manual control may be used to move the servomotor or stepper motor 110 to the full overdrive position.

Reverse mode can be selected with the engine 40 at idle and the foot brake applied. When the foot brake is released and the throttle is opened, the electronic control unit 100 signals the brake modulation valve 97 to gradually apply the hydraulic brake 85 while also signaling the stepper motor 110 to stroke the transmission to some reverse ratio. The electronic control unit 100 will modulate the brake modulation valve 97 to give a smooth take off in reverse. There is only a limited amount of ratio available in reverse thereby limiting the speed in reverse to a safe and acceptable amount. The electronic control unit 100 will determine the reverse ratio from the throttle position and engine speed.

A preferred embodiment of the transmission shown schematically in FIG. 1 is shown in FIGS. 6–15 as a serial, bent axis, double planetary, hydromechanical, continuously variable transmission. This transmission has a housing 120, shown in FIGS. 6, and 10–20, for enclosing an operating assembly, shown in FIGS. 7–13. The housing 120 has an input end 119 from which protrudes the outer end 64 of the input shaft 65, and an input end peripheral flange 123 by which the transmission can be attached to the vehicle engine 40. The housing 120 also has an output end 121 from which protrudes the output end 96 of the output shaft 76. The housing 120 has a large opening 122 at the underside surrounded by a peripheral flange 124 to which a sump pan 125, shown in FIGS. 6, 11–14 and 21–24, is attached by conventional removable fasteners (not shown) for easy access to the interior of the housing 120.

A circular end closure 126, shown in FIGS. 6 and 10–13, and shown in detail in FIGS. 25–31, is fastened into a circular recess 127 in the input end opening of the housing 120 by machine screws 128. Holes 129 around the outside of the end closure 126 receive the screws 128 which are threaded into tapped holes in bosses 130 in the inside of the housing 120 spaced around the circular recess 127. The circular end closure 126 has a central opening 131 through which the end of the input shaft 65 extends, and a central cylindrical recess 132 for receiving the make–up pump 75. The make-up pump 75 can be any suitable type of pump for the application, such as a vane pump of known construction, having a pump rotor driven by the input shaft 65 in a pump housing 133, shown in FIGS. 10–13 and FIGS. 32–36.

Figure 43:
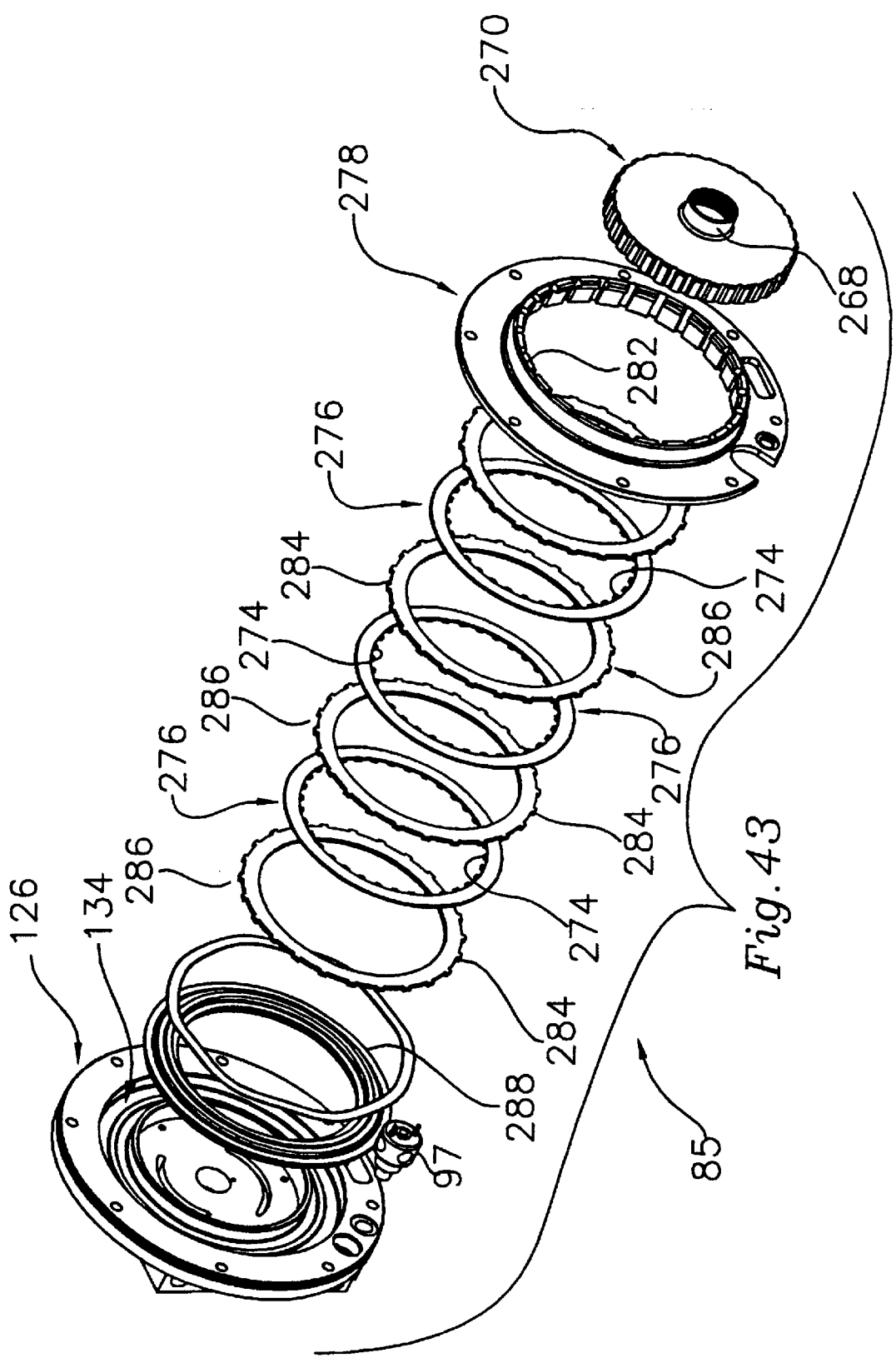
FIGS. 43 and 44 are perspective exploded views of the brake shown in FIGS. 10–13.
Figure 44:
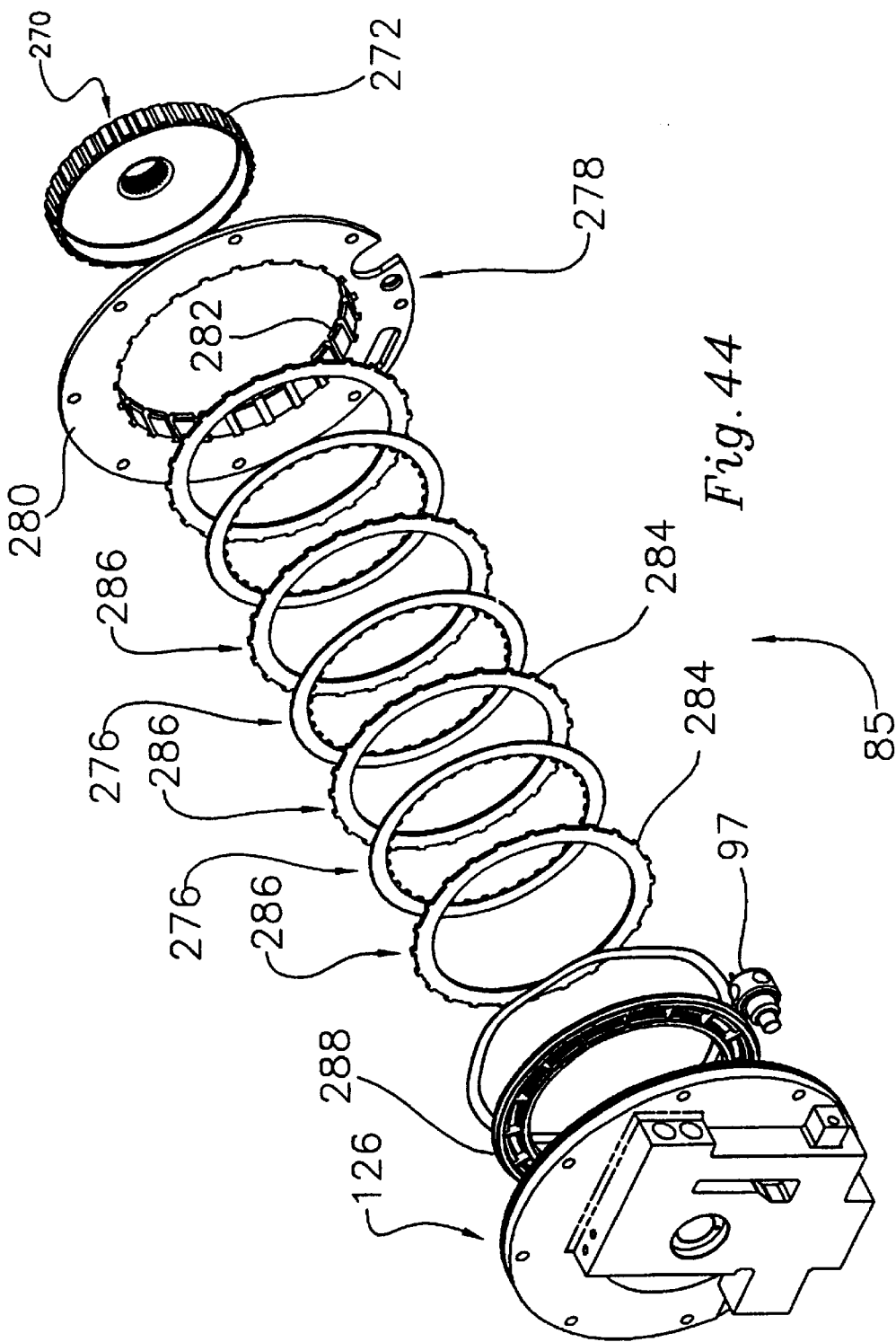

An annular cylinder 134 in the inner face of the circular end closure 126, concentric with the cylindrical recess 132, receives the brake 85, as shown in FIGS. 10–13 and shown exploded in FIGS. 43 and 44. The brake 85 enables the pump 60 and downstream components of the operating assembly to be smoothly engaged and disengaged from the input shaft 65, as described above and in detail below.

Figure 6:
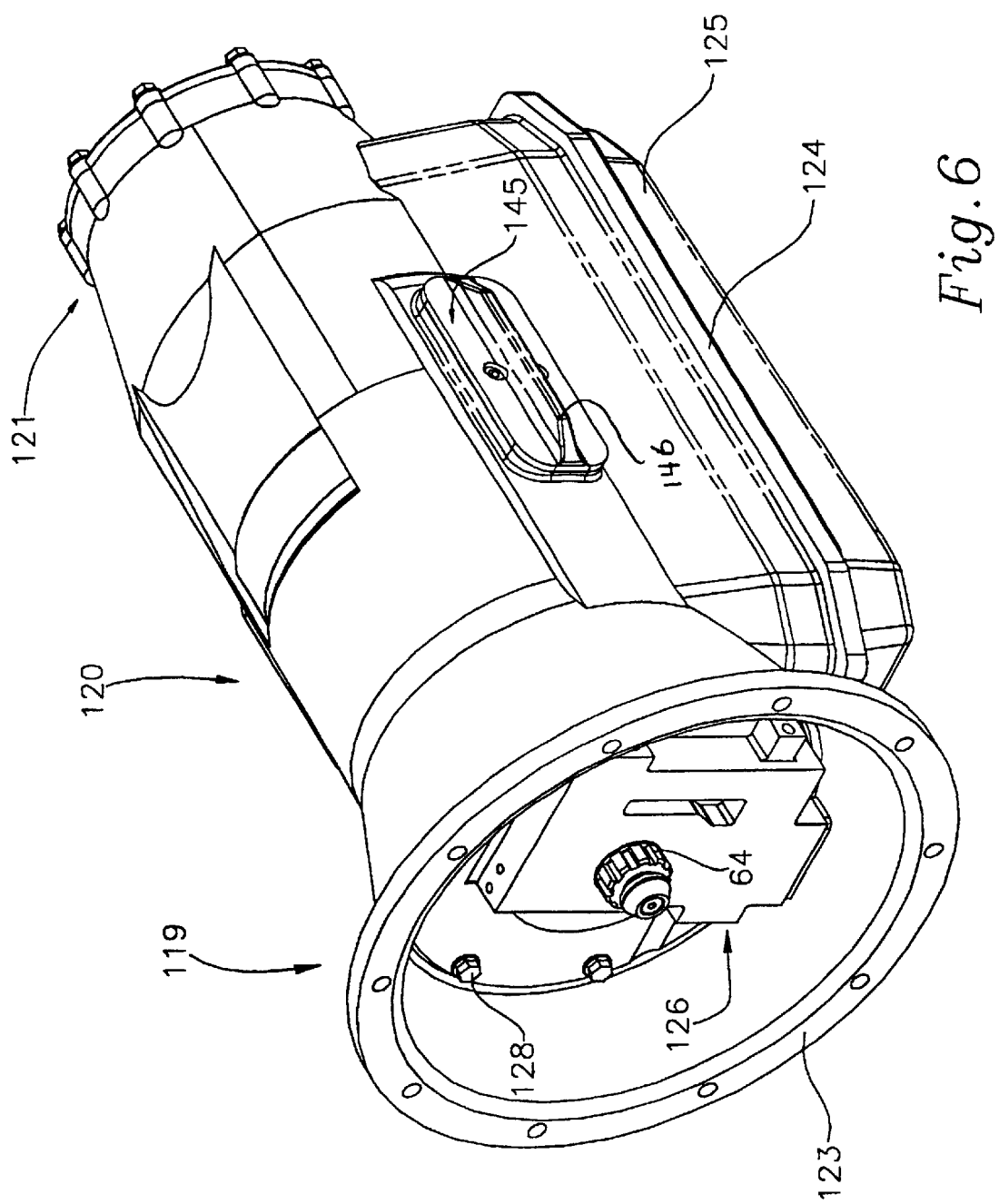
FIG. 6 is a perspective view of a preferred embodiment of the transmission shown in FIG. 1.
Figure 8:
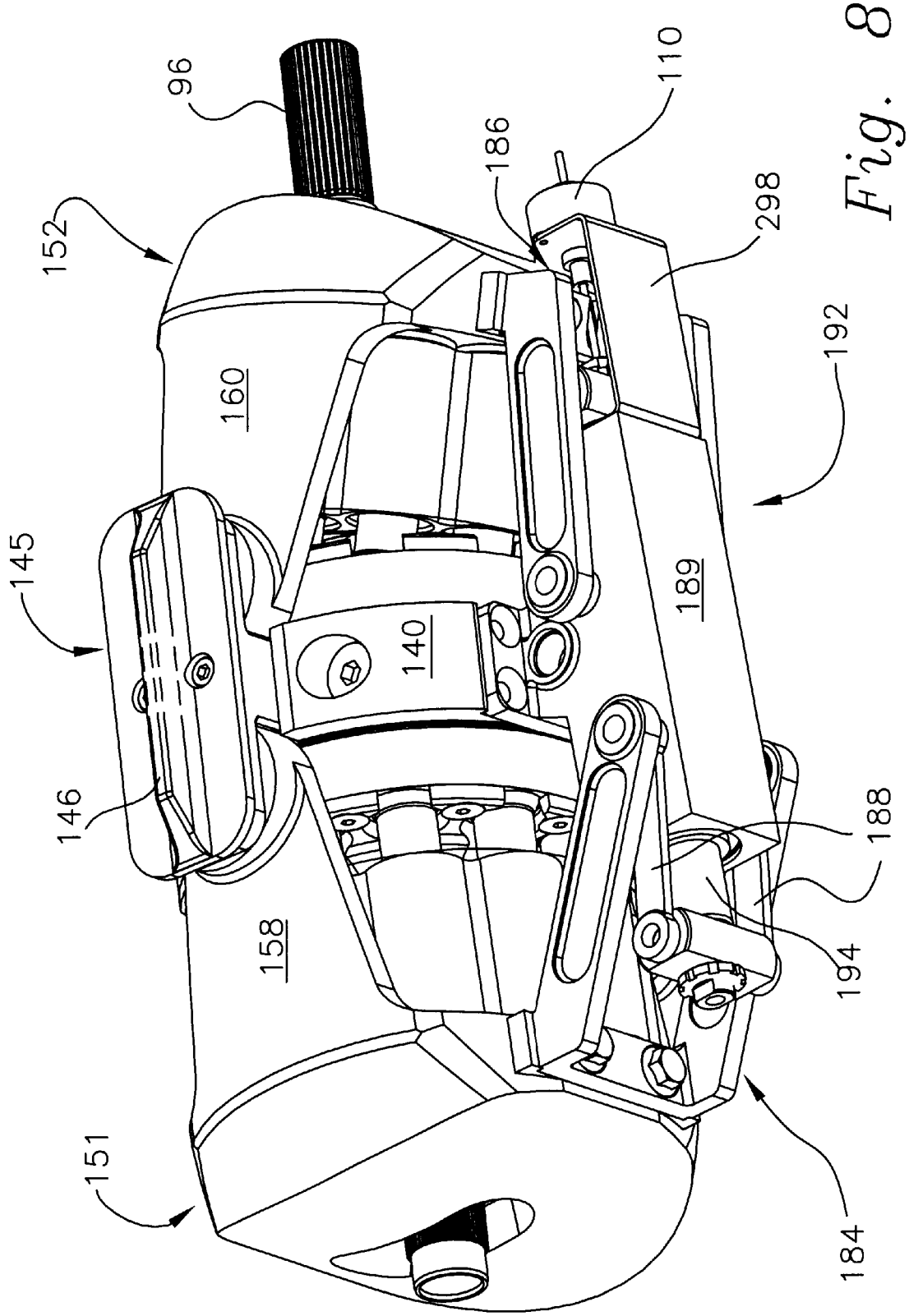
Figure 9:
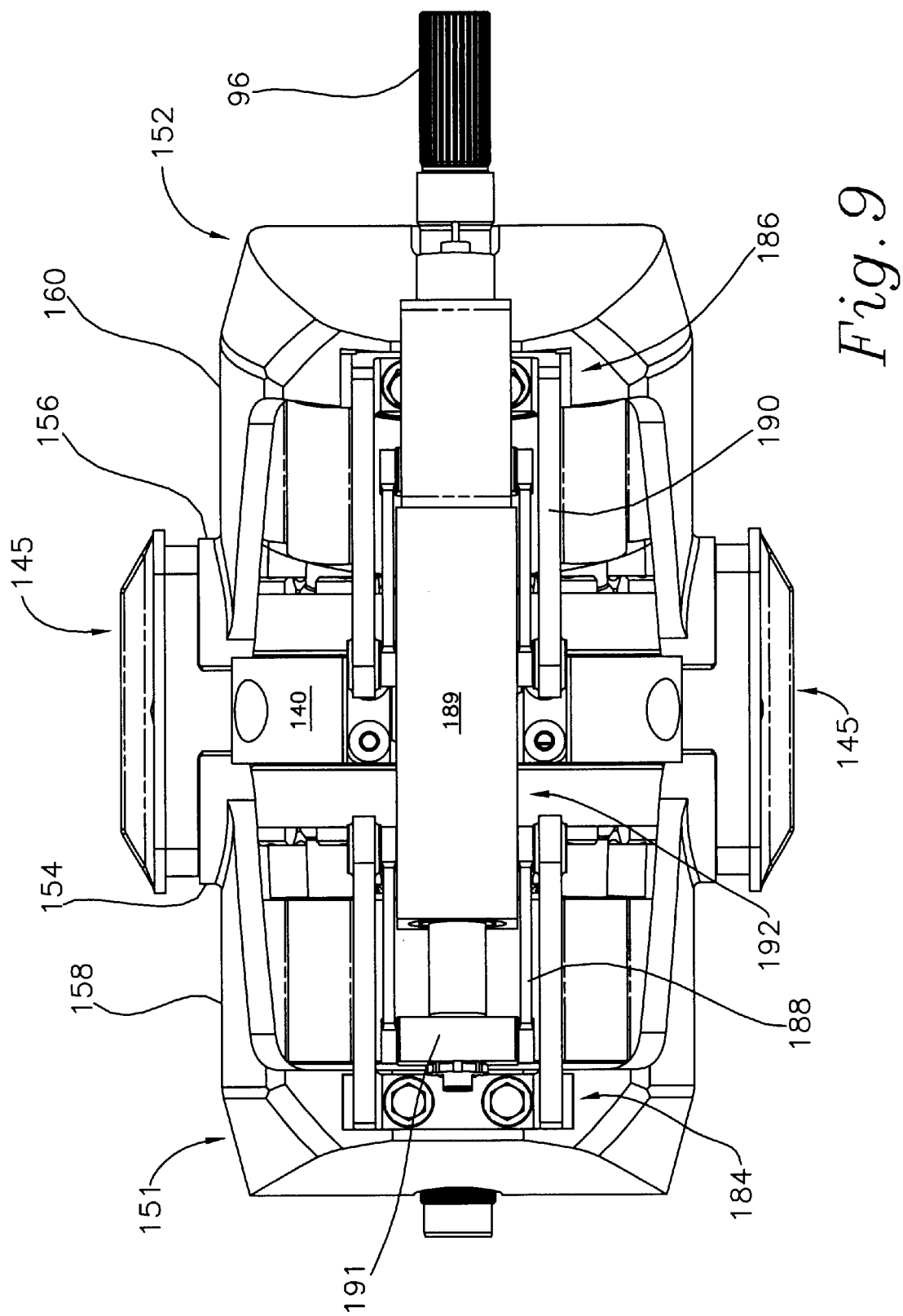
FIG. 9 is a plan view from below of the internal components of the transmission shown in FIG. 6.
Figure 10:
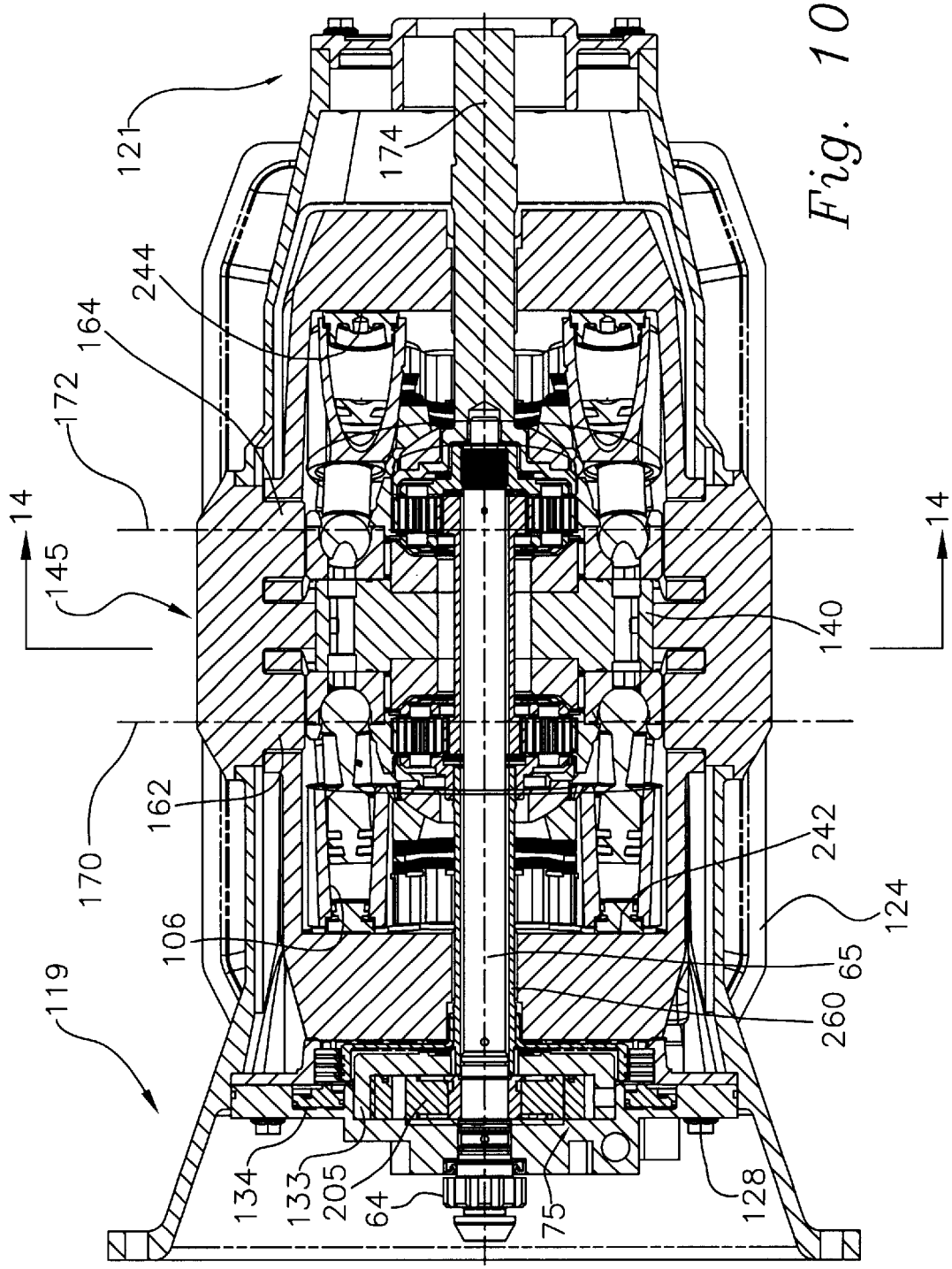
FIG. 10 is a sectional plan view from above of the transmission shown in FIG. 6, along a horizontal section line through the longitudinal axis of the transmission.
Figure 48:
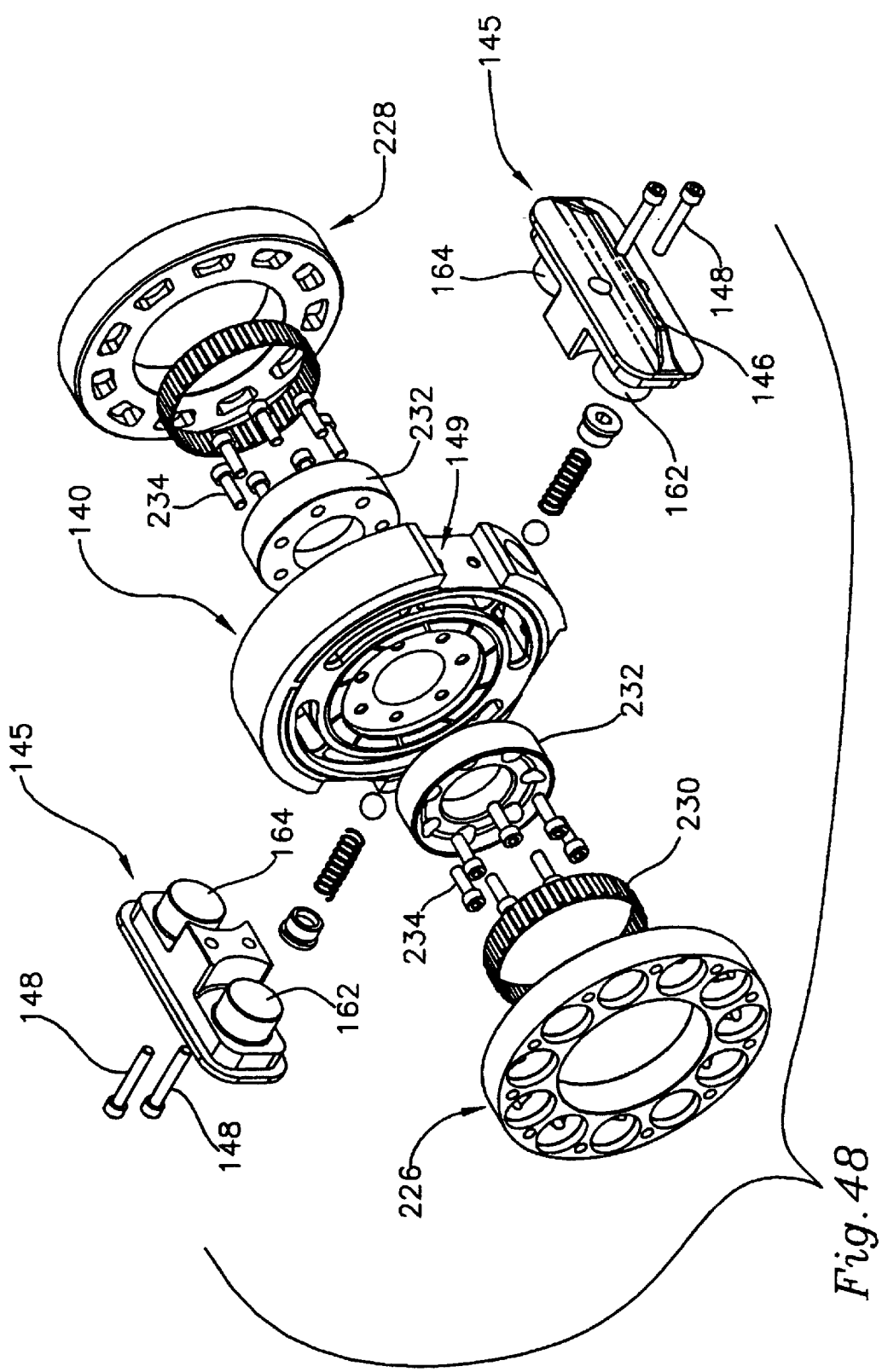
FIG. 48 is an exploded perspective view of components adjacent the manifold block shown in FIGS. 7–14.
Figure 49:
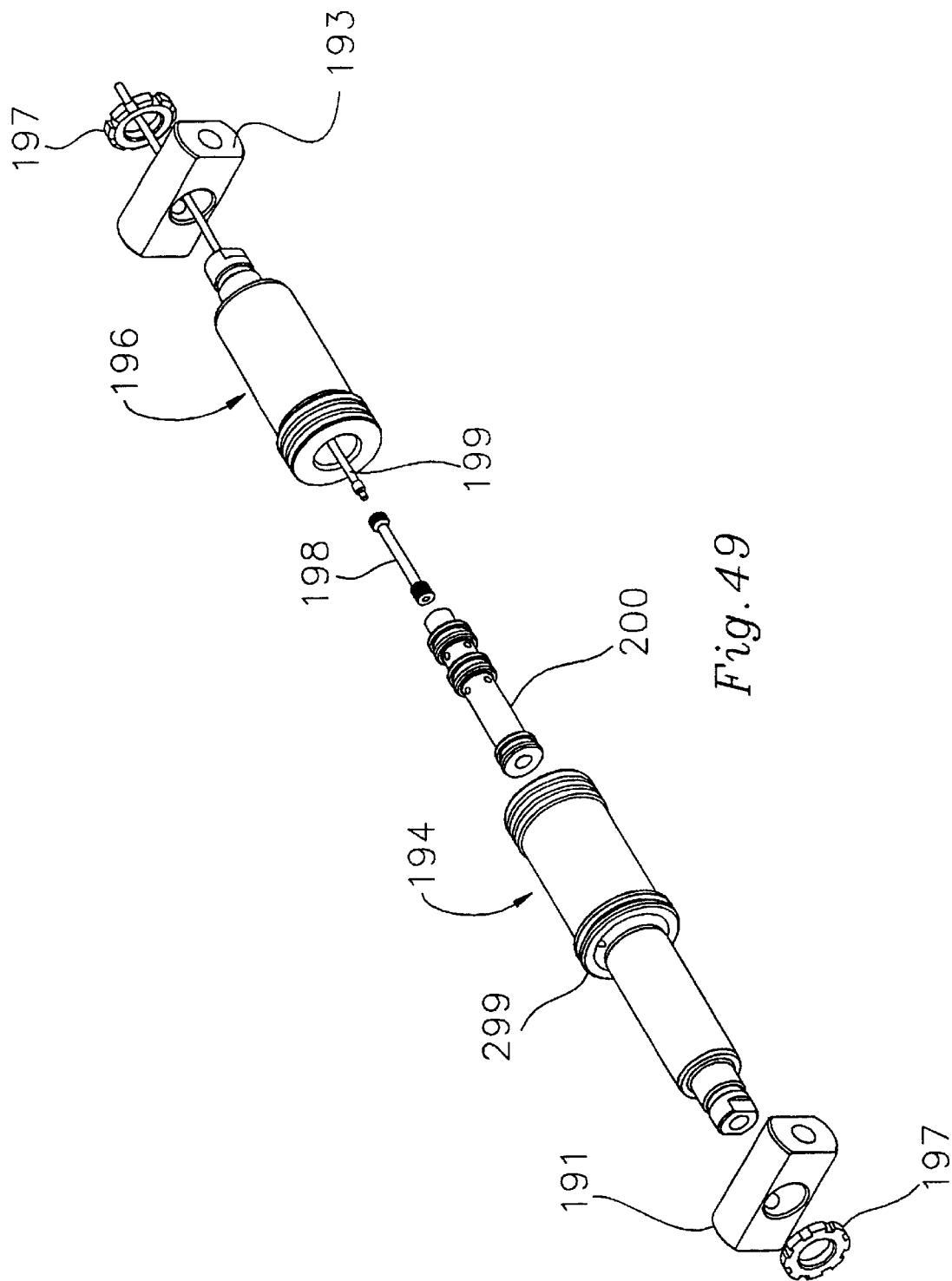
FIG. 49 is an exploded perspective view of the control actuator shown in FIGS. 7–9 and 11–15.
Figure 51:
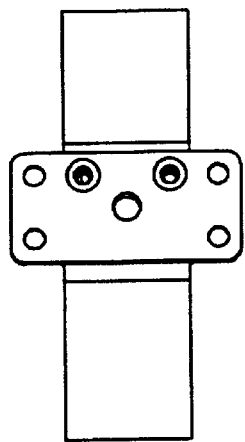
FIGS. 50–53 are various views of the cylinder block shown in FIGS. 7–9 and 11–15 for receiving the components shown I FIG. 49
Figure 53:
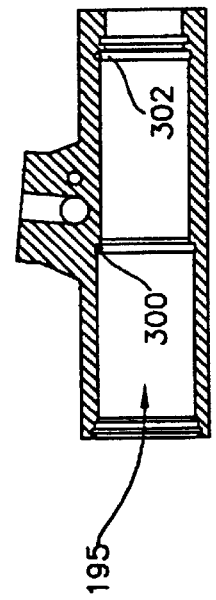
Figure 50:
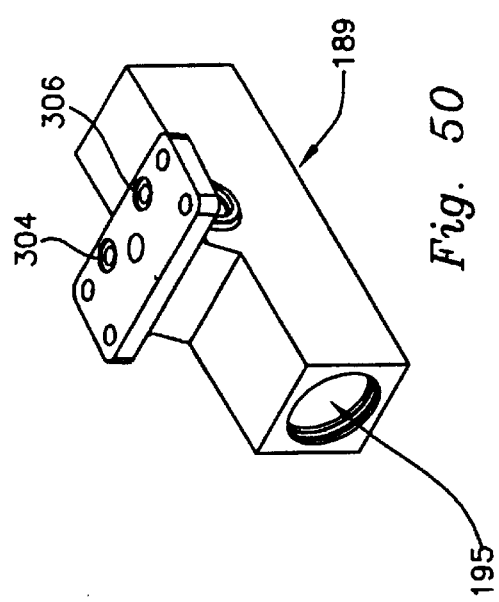
Figure 52:
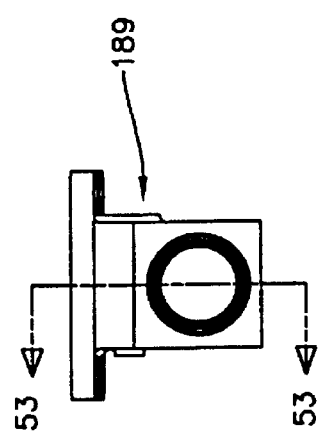

The operating assembly shown in FIGS. 7–13 includes the input hydrostatic pump unit 50 and the output hydrostatic motor unit 60 hydraulically related to each other through the fluid passages 90 and 95, which extend straight through a stationary manifold block 140 between the pump 50 and the motor 60. The pump 50 and motor 60 are mechanically related through the first variable ration gear set such as an epicyclic planetary or differential gear set 70 and the second similar gear set 80. The stationary manifold block 140, shown in FIGS. 7–15 and shown in detail in FIGS. 37–42, is connected to the housing 120 through a pair of identical connector links 145, as shown in FIGS. 10, 14 and 48. Each connector link 145 has a longitudinal stiffening rib 146 along its outside face, primarily to resist loads exerted on the link 145 by the yokes, discussed below. The links 145 are fastened by screws 148 into recesses 149, one in each side of the stationary manifold block 140, and project out through openings 150 in the housing 120, as shown in FIGS. 6, 10 and 14, to fix the manifold 140 in the housing without unnecessary enlargement of the housing 120.

As shown in FIGS. 7–10, and 47, an input yoke 151 and an output yoke 152 are each pivotally connected to the connector links 145 by swivel barrels 154 and 156 on the ends of yoke arms 158 and 160 on the input and output yokes 150 and 152. Both yokes 151 and 152 are identical to each other, so the description of one will suffice for both. The swivel barrels 154 and 156 are mounted for swiveling about two horizontal axes 170 and 172, shown in FIG. 10, on longitudinally spaced integral stub shafts 162 and 164 that project inwardly from the connector links 145. The two sets of stub shafts 162 and 164 are aligned on the axes 170 and 172, shown in FIG. 10, that intersect the main longitudinal axis 174 of the machine at the center of curvature of two convex spherical bearings 176 and 178 on which annular pump and motor cylinder blocks 180 and 182 are guided, as described below. The main longitudinal axis 174 of the machine coincides with the axis of the input shaft 65 and the coaxial output shaft 76.

Figure 7:
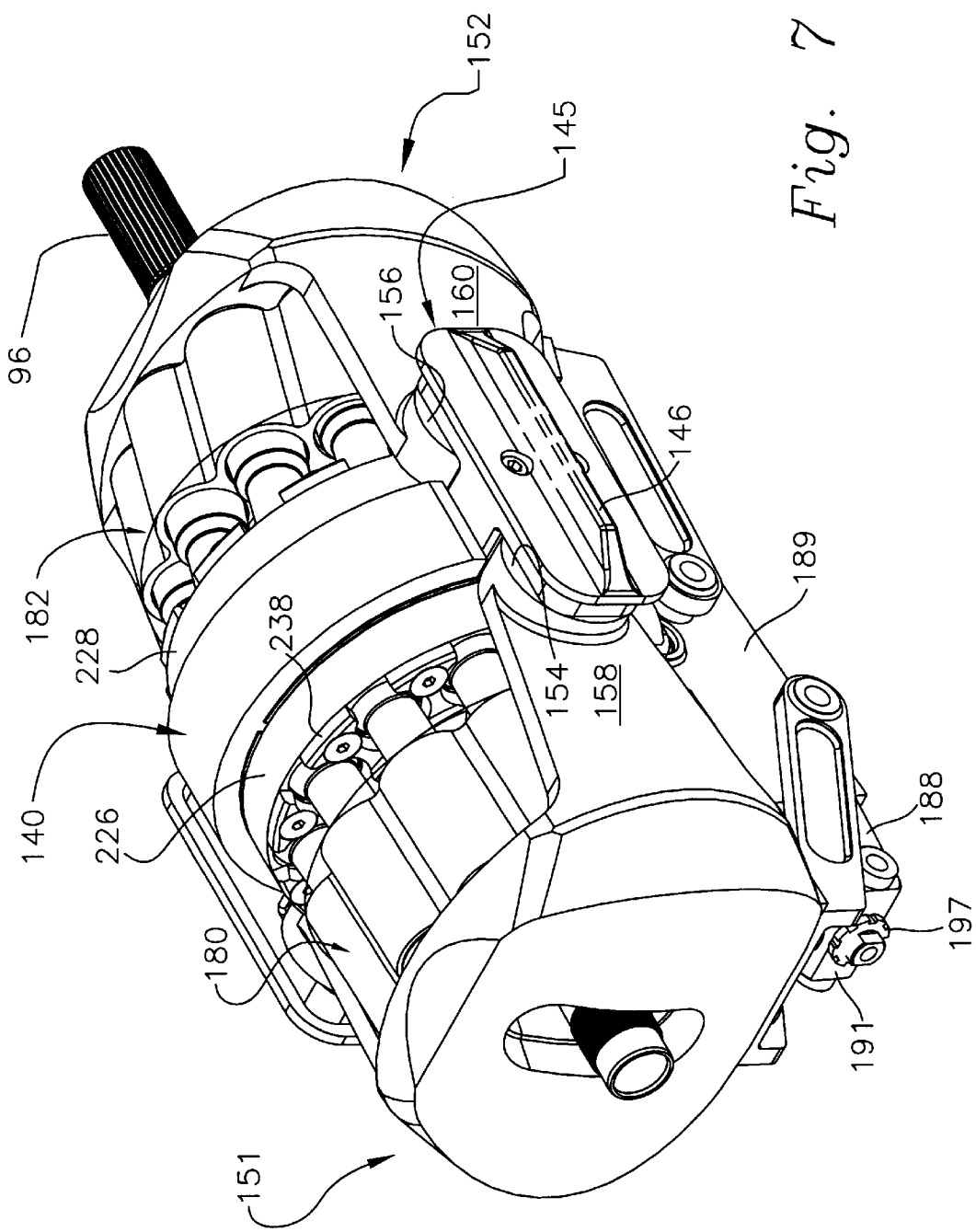
FIGS. 7 and 8 are perspective views of the internal components of the transmission shown in FIG. 6, from above and below, respectively, with the housing removed for clarity of illustration.

Each yoke 151 and 152 has a mounting flat 183 on its lower surface to which is attached a control clevis 184 and 186, respectively, each having a pair of spaced-apart depending arms. Control links 188 and 190, seen in FIGS. 7–9, are pinned between the lower ends of the control clevis arms and a control actuator 192, shown in detail in FIGS. 8, 9, 11–13 and 49. The actuator 192 includes an actuator cylinder block 189, shown in detail in FIGS. 50–53, which is fastened to the underside of the stationary manifold block 140, as shown in FIGS. 8 and 9, so it is stationary relative to the manifold block 149 and the housing 120. The control links 188 and 190 are pinned to the ends of bars 191 and 193 mounted on the outer ends of two control pistons 194 and 196 and held thereon by nuts 197. The control pistons move in the cylinder 195 in the cylinder block 189 under the influence of hydraulic fluid controlled by a spool 198 connected to a rod 199 moved by the servomotor or stepper motor 110 to control the tilt angle of the yokes 151 and 152, as discussed below. The stationary nature of the actuator 192 makes control of the control yokes 151 and 152 simple, consistent and reliable. The stationary nature of the stationary manifold block 140 also affords access into the fluid circuit for simple connection of make-up fluid flow lines by way of a tapped port 201. External taps into the pressure channels for regenerative braking/acceleration and hydraulic power take-off are also made possible without the use of rotating interfaces or the like by the stationary manifold block 140.

The make-up pump housing 133, shown in FIGS. 32–36, has a cylindrical recess 202 in which a rotor 204 and vanes 205 of the make-up pump 75 are mounted and driven by the input shaft 65, as shown in FIGS. 10–13, for pressurizing fluid drawn from the sump pan 125 to recharge the fluid circuit with fluid lost through leakage, and to pressurize the actuator 92. The hydraulic fluid from the make-up pump also is use to lubricate the bearings and sliding interfaces in the transmission.

Figure 11:
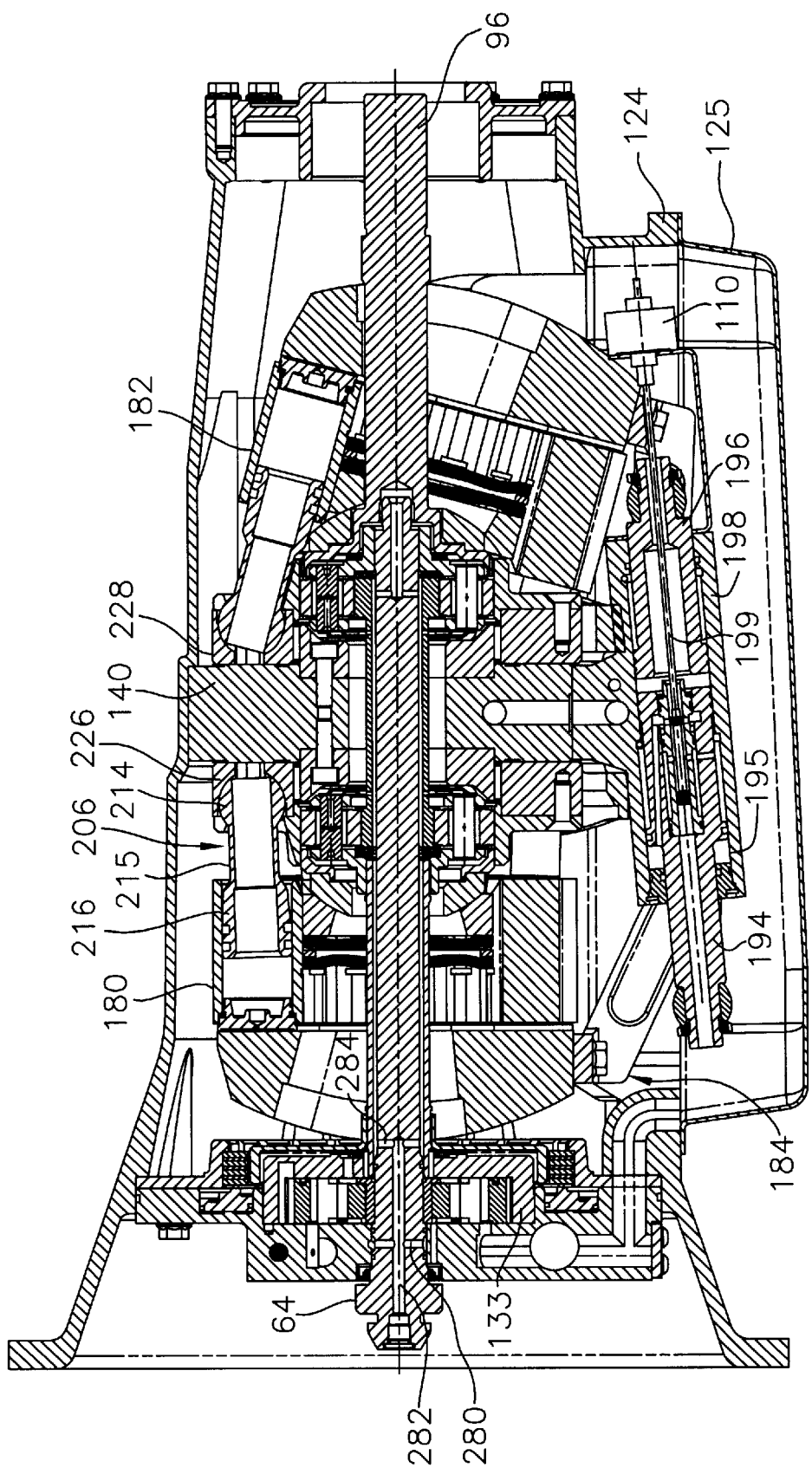
FIG. 11 is a sectional elevation of the transmission shown in FIG. 6 along a vertical section line through the longitudinal axis of the transmission, illustrating the transmission in neutral.
Figure 12:
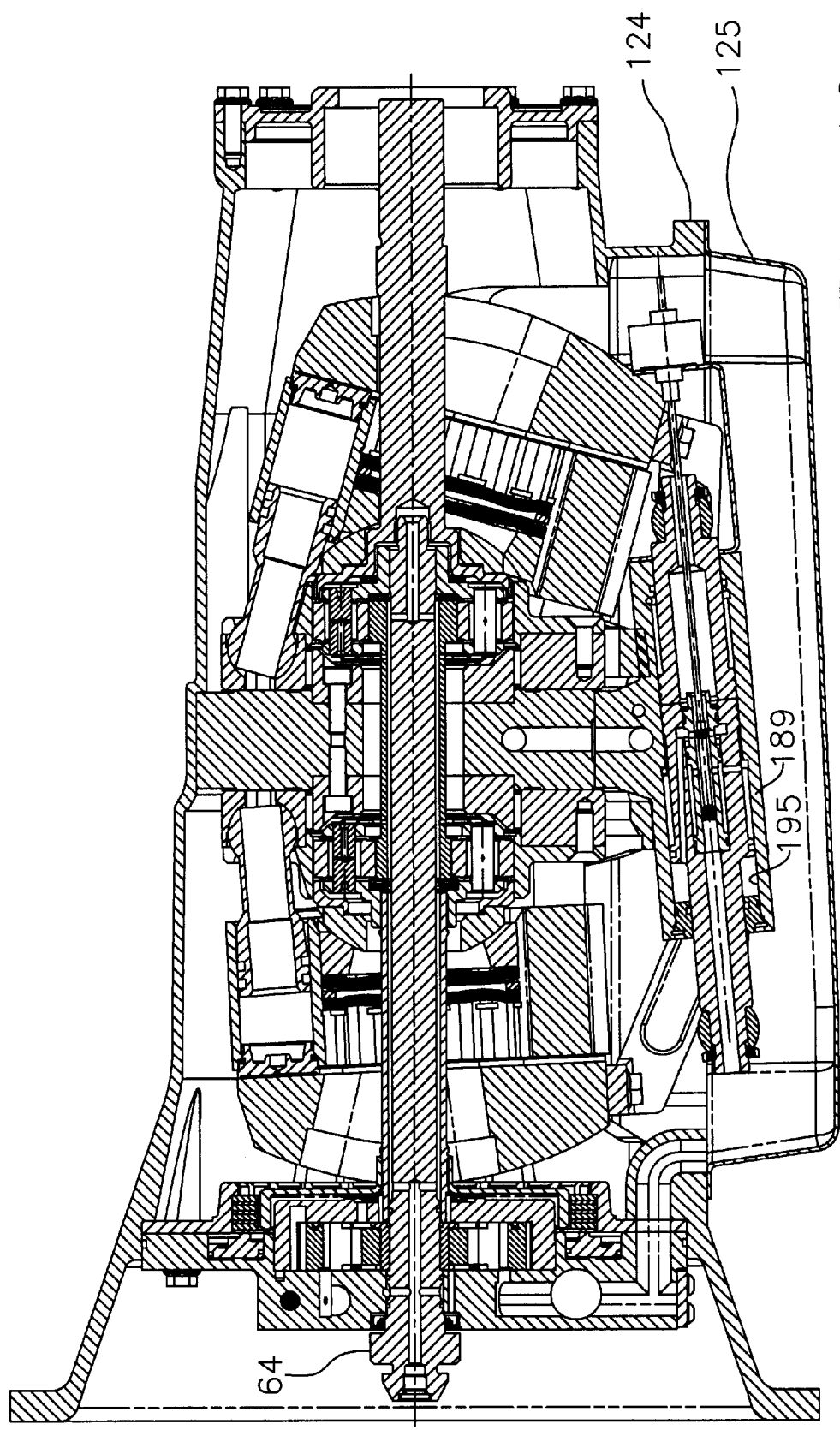
FIG. 12 is a sectional elevation of the transmission like that of FIG. 11, illustrating the transmission at maximum torque.
Figure 13:
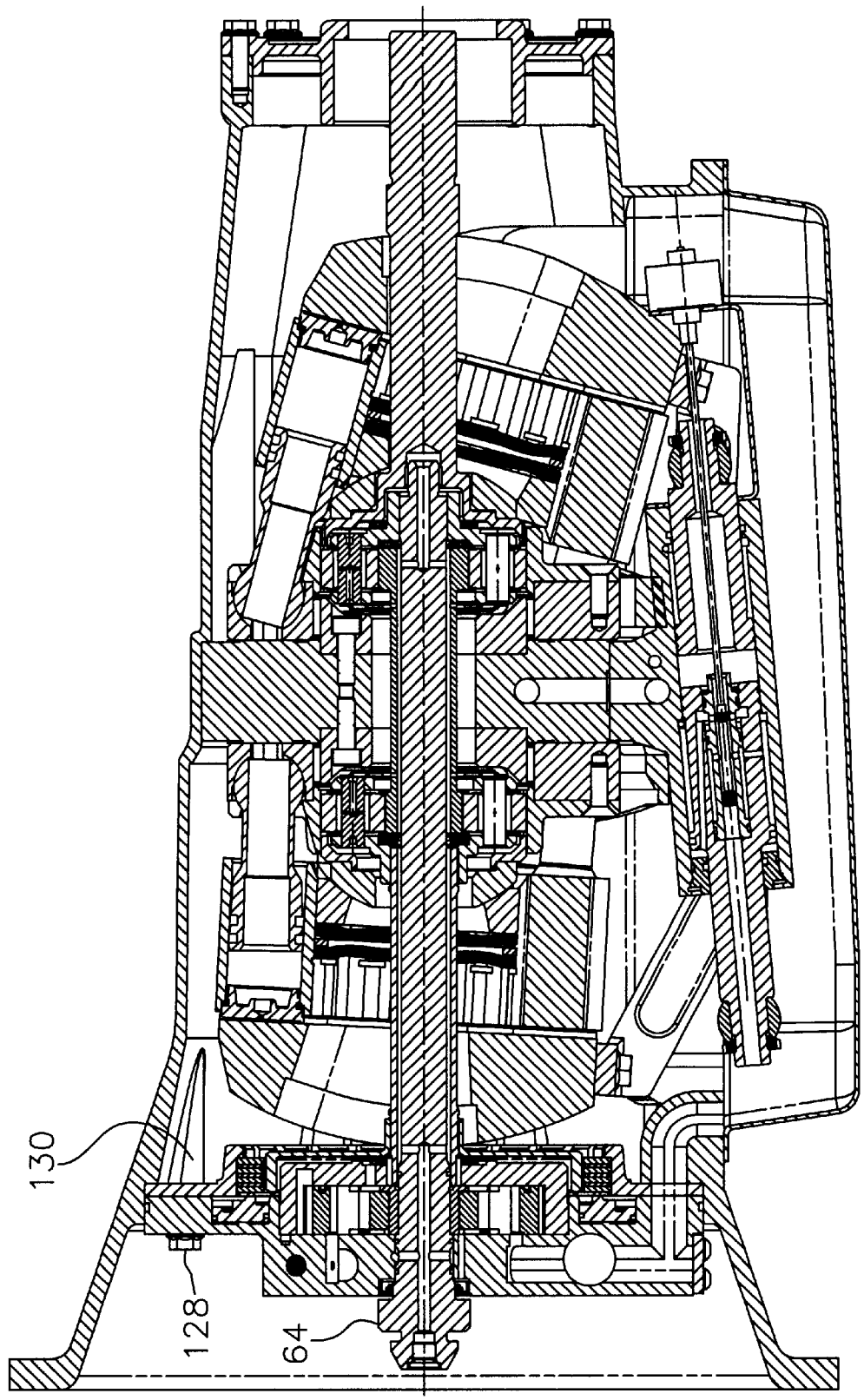
FIG. 13 is a sectional elevation of the transmission like that of FIG. 11, illustrating the transmission in reverse.
Figure 14:
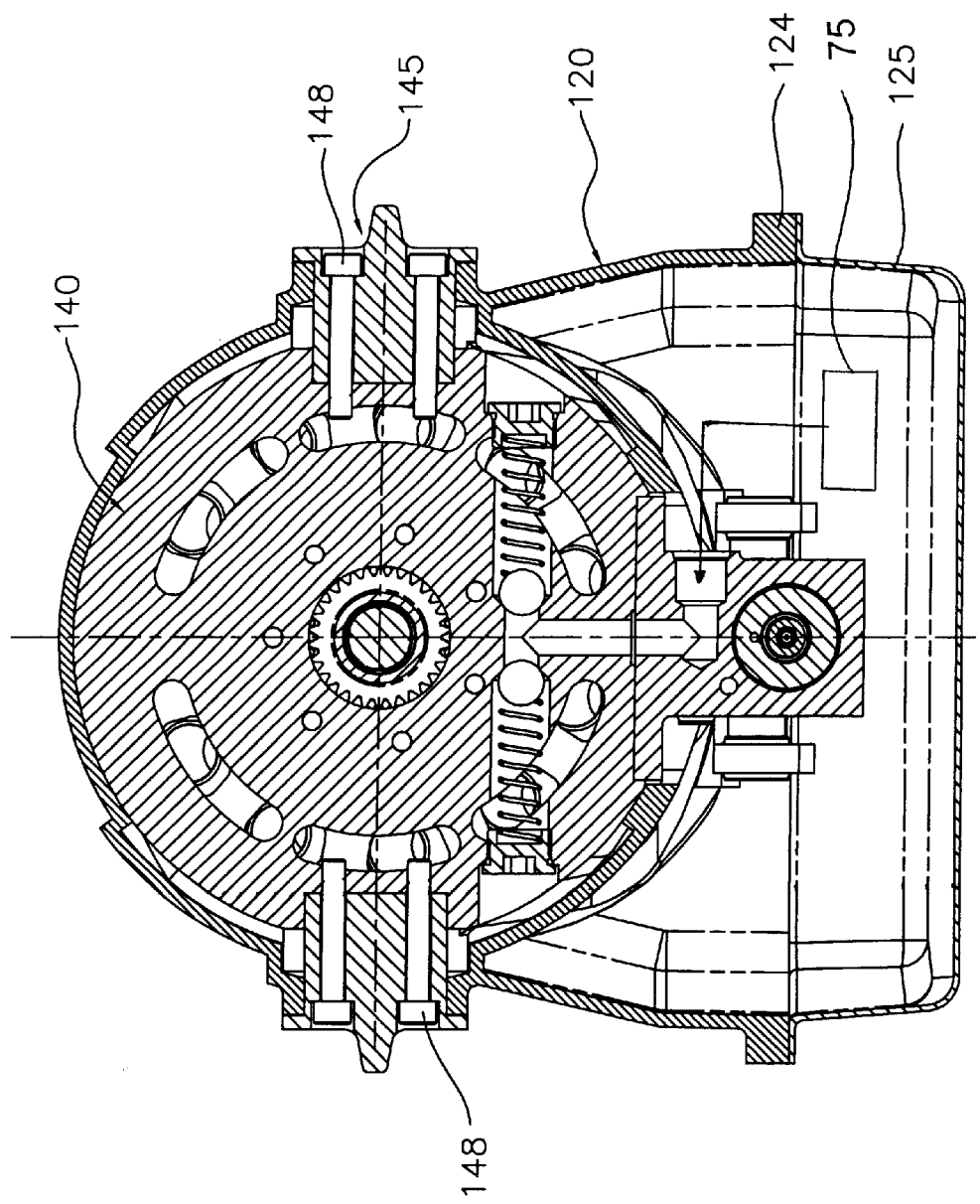
FIG. 14 is a sectional elevation of the transmission shown in FIG. 6 along lines 14—14 in FIG. 10, showing the fluid flow channels in the manifold block for make-up fluid.
Figure 15:
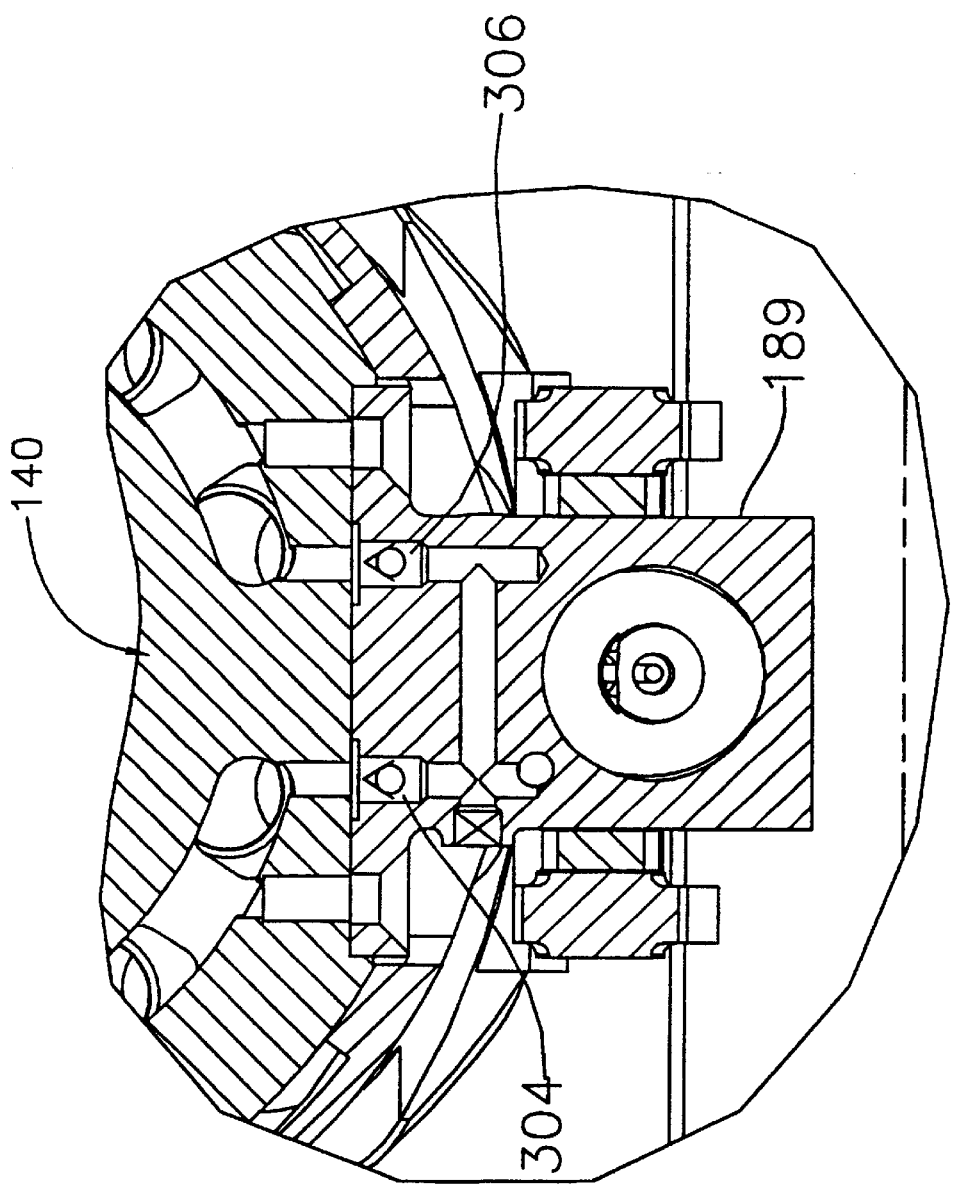
FIG. 15 is a partial sectional elevation through the manifold block and control cylinder, showing the fluid flow channels for the control actuator shown in FIGS. 11–13 and 49.
Figure 19:
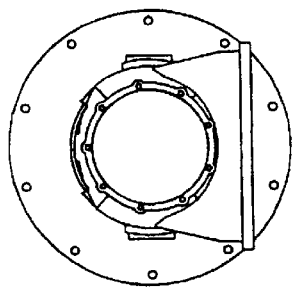
FIG. 19 is an end elevation of the housing shown in FIG. 16 from the output end.
Figure 20:
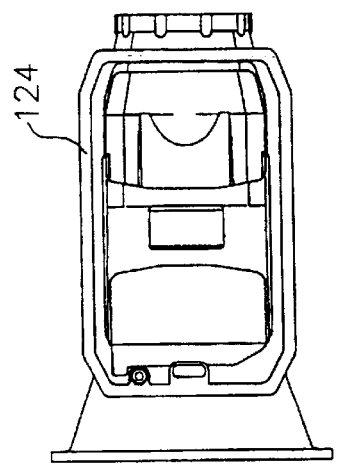
Figure 18:
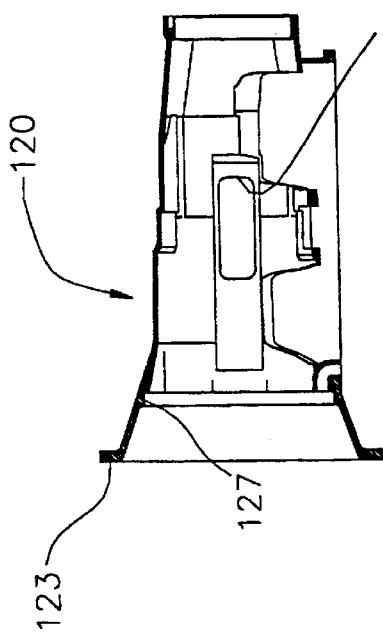
FIG. 18 is a sectional elevation of the housing shown in FIG. 16 along a vertical plane through the longitudinal axis of the housing.
Figure 17:
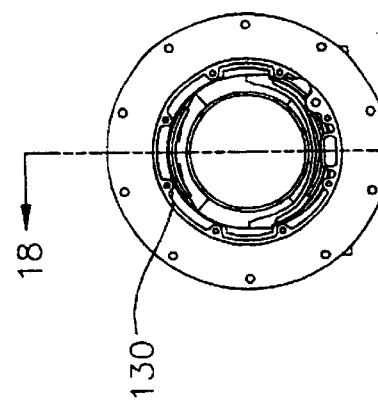
FIG. 17 is an end elevation of the housing shown in FIG. 16 from the input end.
Figure 16:
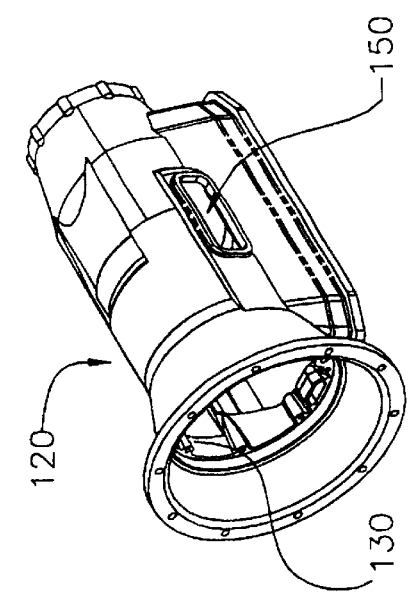
FIG. 16 is a perspective view of the housing shown in FIG. 6 without the internal components.
Figure 21:
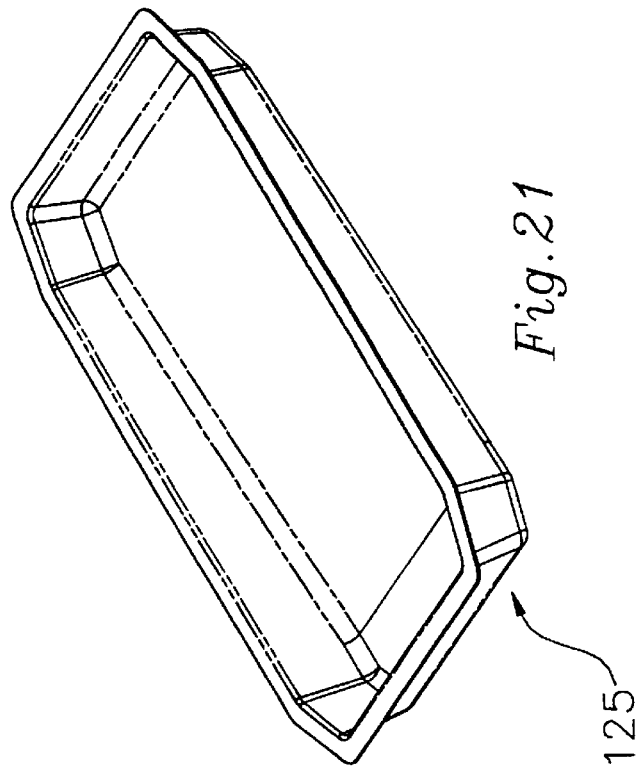
FIGS. 21–24 are various views of the oil sump pan shown attached to the underside of the housing in FIGS. 6 and 11–14.
Figure 23:
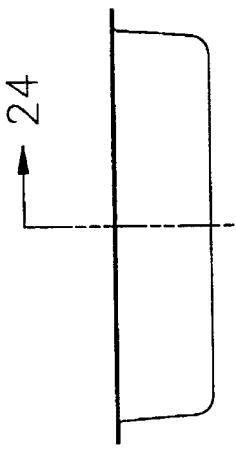
Figure 22:
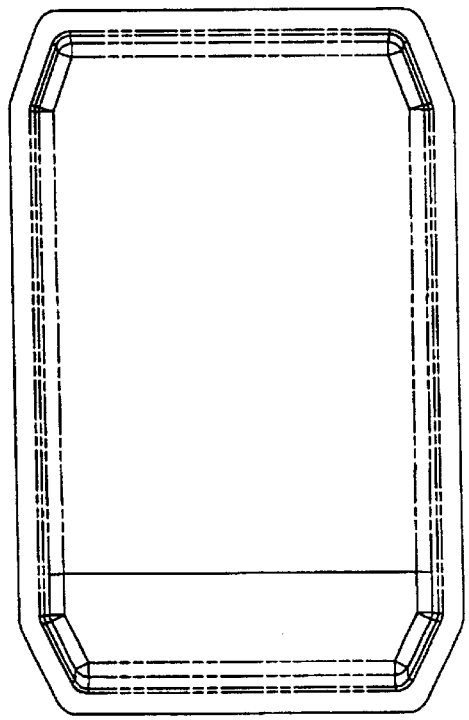
Figure 24:
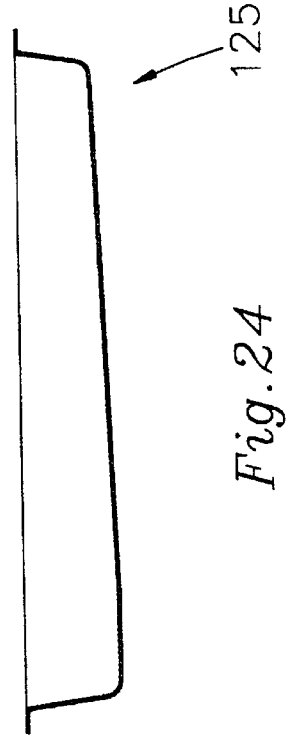
Figure 41:
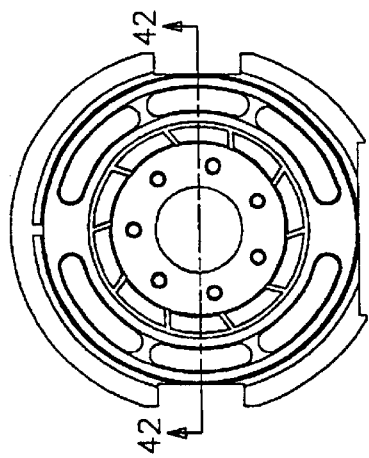
FIGS. 37–42 are various views of the manifold shown in FIGS. 7–15.
Figure 42:
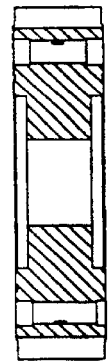
Figure 39:
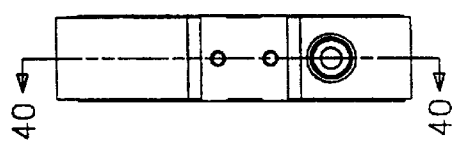
Figure 40:
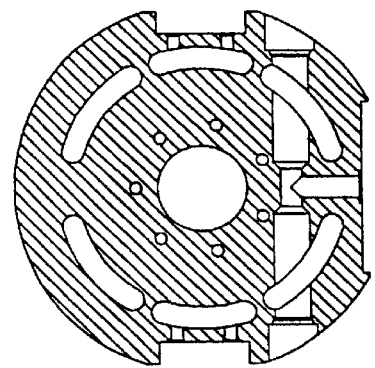
Figure 38:
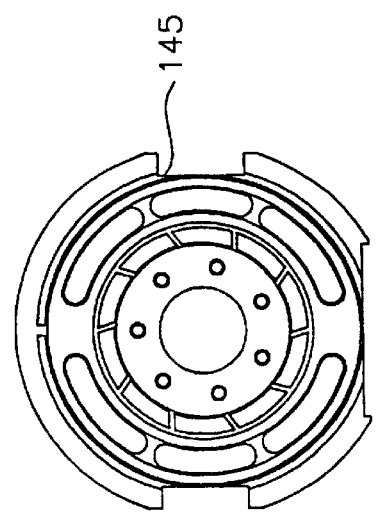
Figure 37:
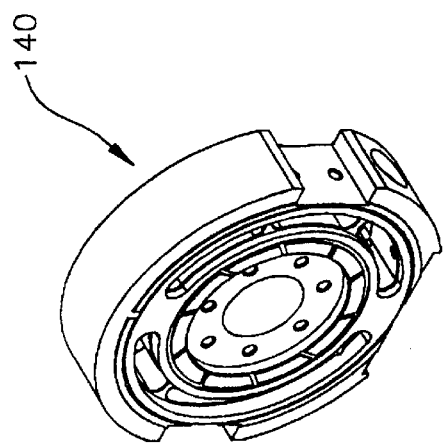
Figure 46:
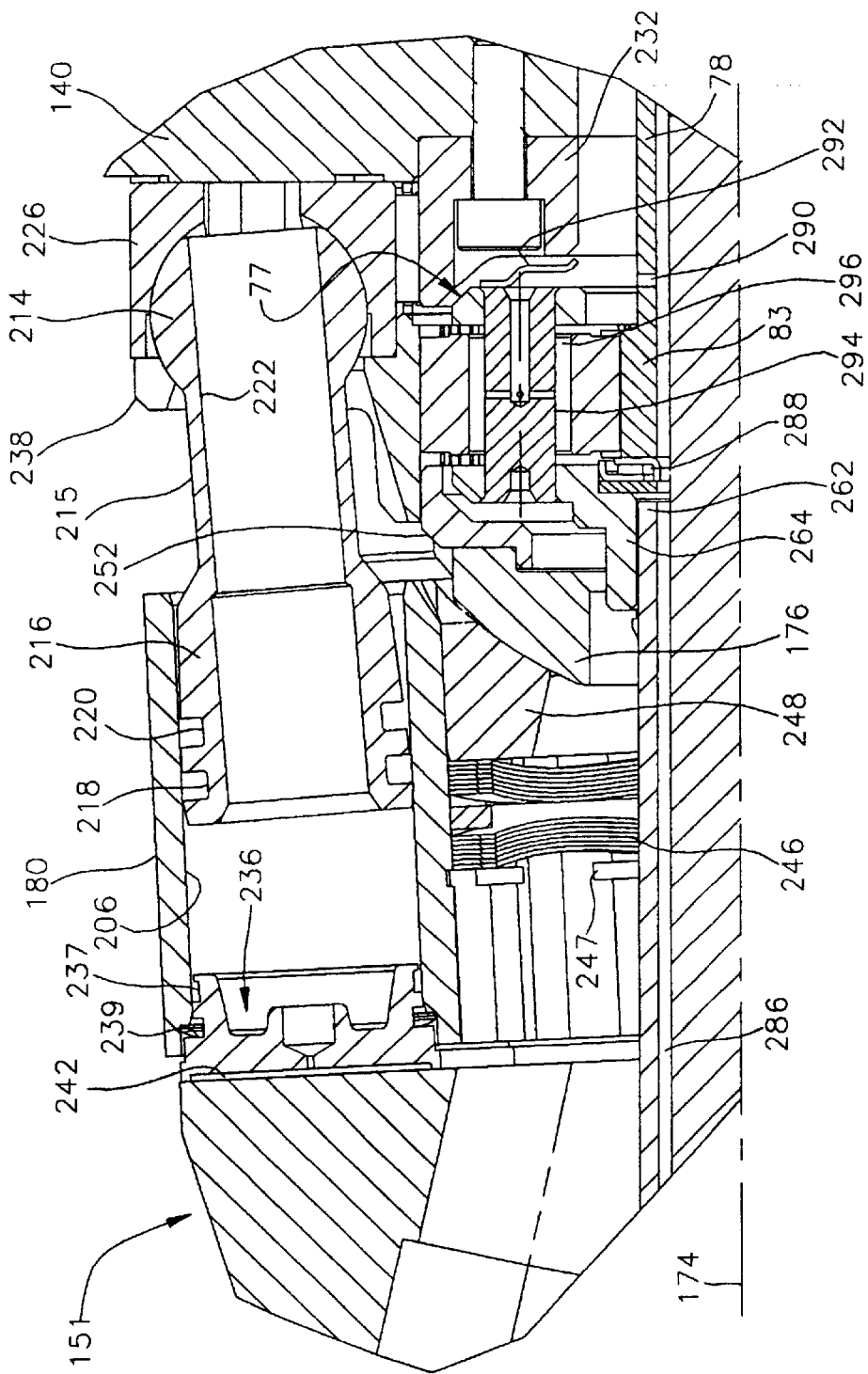
FIG. 46 is an enlarged sectional elevation of a portion of the pump drive components shown in FIGS. 10–13.
Figure 47:
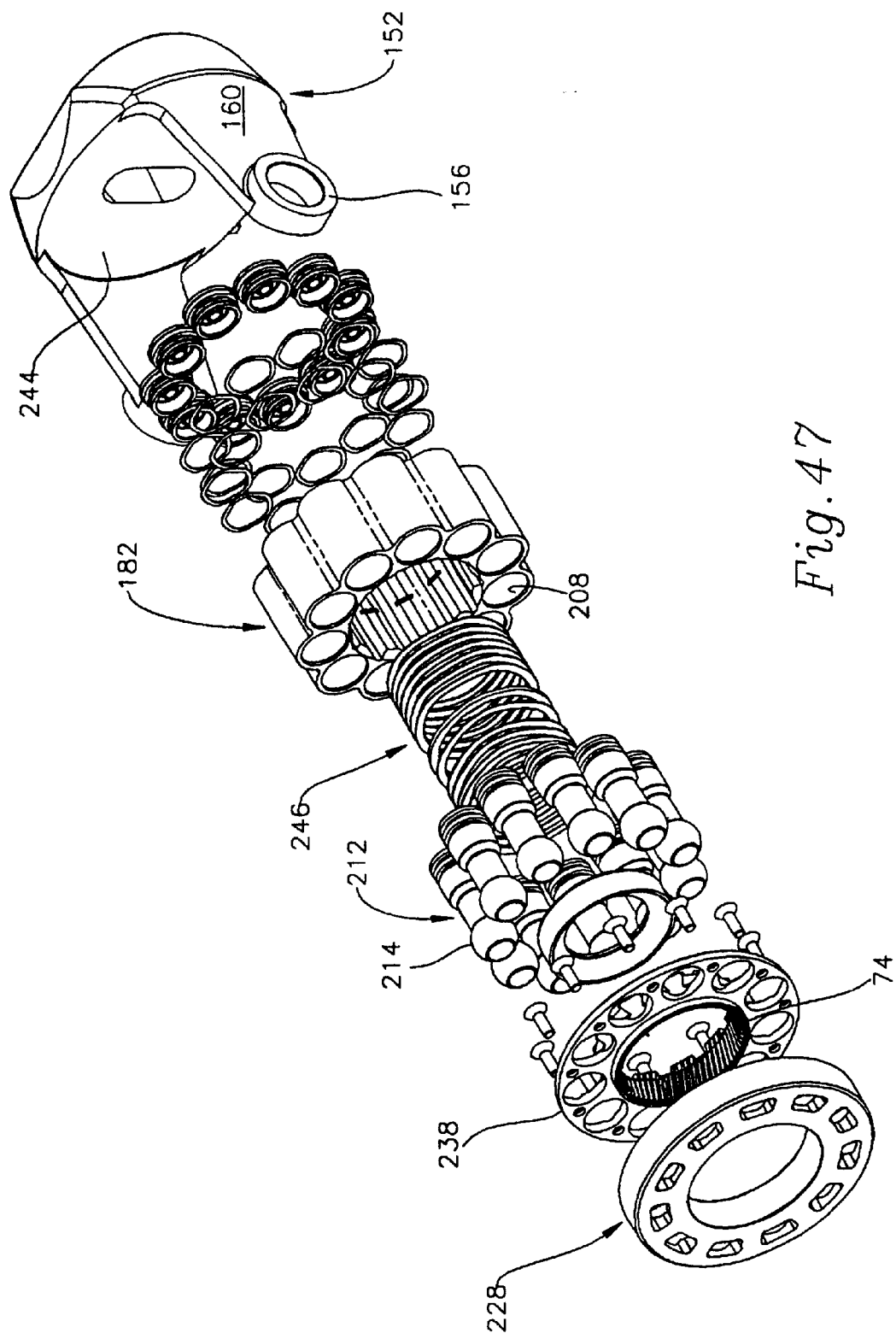
FIG. 47 is an exploded perspective view of selected motor components shown in FIGS. 10–13.

As shown in FIGS. 7, 10 and 47, the annular pump and motor cylinder blocks 180 and 182 of the input and output hydrostatic units 50 and 60 each include a ring of cylinders 206 and 208 in which hollow pump and motor pistons 210 and 212, respectively, are disposed, as shown in FIGS. 11–13. All the pistons 210 and 212 are identical, so a description of one will suffice for all. Each piston, as best seen in FIG. 46, has a spherical head 214 and a cylindrical base 216 connected by a cylindrical shank 215. The cylindrical base 216 tapers toward the head 214 from a pair of annular grooves 218 and 220 in the base for receiving piston rings (not shown). An axial bore 222 extends completely through each piston 210 and 212 for conveying fluid from the cylinders in the cylinder block on one side of the manifold block, through the fluid passages 90 and 95 in the manifold block, through the pistons on the other side of the manifold block and into the cylinders in the other cylinder block.

The spherical heads of the pistons 210 and 212 are seated in spherical sockets 224 in a pump torque ring 226 and a motor torque ring 228, each having a flat face in contact with the manifold block 140. The only two rotating fluid transfer interfaces in the transmission are the interfaces between the two sides of the manifold block 140 and the two torque rings 226 and 228. No torque is transmitted through these interfaces so distortion under torque load is minimal, thereby reducing leakage which otherwise could be caused by distortion of the torque ring face under load. As shown in FIG. 48, the torque rings 226 and 228 are supported for rotation on a ring of caged needle bearings 230 surrounding a bearing support annulus 232 fastened to the center of the manifold block 140 by screws 234, one on each side of the manifold block.

As shown in FIGS. 11–13, 46 and 47, the piston heads 214 are held in the sockets 224 of the torque rings 226 and 228 by retainer rings 238 which are integral with the ring gears 84 and 74. The retainer rings 238 are fastened to the torque rings 226 and 228 by fasteners 240 which also provide a torque path between the ring gears 84 and 74 and the torque rings 226 and 228.

The outer ends of the cylinders 206 and 208 are closed by floating pucks 236 best seen in FIG. 46. The pucks 236 each have a seal groove 237 for receiving a seal ring (not shown) and a spring groove 239 for receiving an annular wave spring which biases the puck outward against flat annular bearing surfaces 242 and 244 on the inner faces of the yokes 151 and 152, as shown in FIG. 47 for the yoke 152. The floating puck can move slightly axially and tilt slightly to follow a momentary perturbation or deviation from flatness of the yoke inner bearing surfaces 242 and 244. A small central hole and cylindrical recess in the outer face of each puck 236 provides a hydrostatic bearing which just reacts the fluid force inside the cylinders 206 and 208 to minimize wear of the pucks and the bearing surfaces 242 and 244 of the yokes 151 and 152.

An axial biasing force is exerted to urge the cylinder blocks 180 and 182 against That axial force is exerted by a set of wave springs 246 compressed between a snap ring (not shown) fitted into grooves 247 in the fluted axial bore 209 of the pump and motor cylinder blocks 180 and 182, and against a spherical ring 248 and 250 which is guided for tilting on the spherical bearings 176 and 178 about the centers of curvature of the spherical interfaces of the spherical rings and spherical bearings. The spherical rings 248 and 250 guide the pump and motor cylinder blocks 180 and 182 on the spherical bearings 176 and 178 for rotation and tilting about their respective centers of mass. Those centers of curvature coincide with the intersection of the axes 170 and 172 through the stub shafts 162 and 164, and the longitudinal axis 174 of the machine, as shown in FIG. 10, so that the axes of rotation of the cylinder blocks always intersects the tilting axis of the yokes 151 and 152 and the cylinder blocks always rotate about their centers of mass to ensure dynamic balance of the rotating elements. The axial force exerted by the two sets of wave springs 246 is transmitted through the spherical rings 248 and 250 to the spherical bearings 176 and 178, and thence (on the pump side) to a pump preload flange 252, shown most clearly in FIGS. 46 and 46A. The radial outer surface of the pump preload flange 252 is splined at 253 and engaged with splines 254 in the bore of the ring gear 84. The splines 254 are shallower than the teeth of the ring gear 84, so the preload flange 252 can slide into the ring gear 84 only about one quarter of the way until it is engaged by the higher teeth of the ring gear 84. This engagement enables the axial force exerted on the preload flange 252 by the spherical bearing 176 to be transmitted to the ring gear 84 and its integral retainer ring 238 and thence to the torque ring 226 for ensuring contact of the torque ring 226 against the manifold block during start-up so that the fluid system remains sealed and make-up pump pressure can be developed by the make-up pump 75 for lubrication flow and charging the system during start-up.

Figure 45:
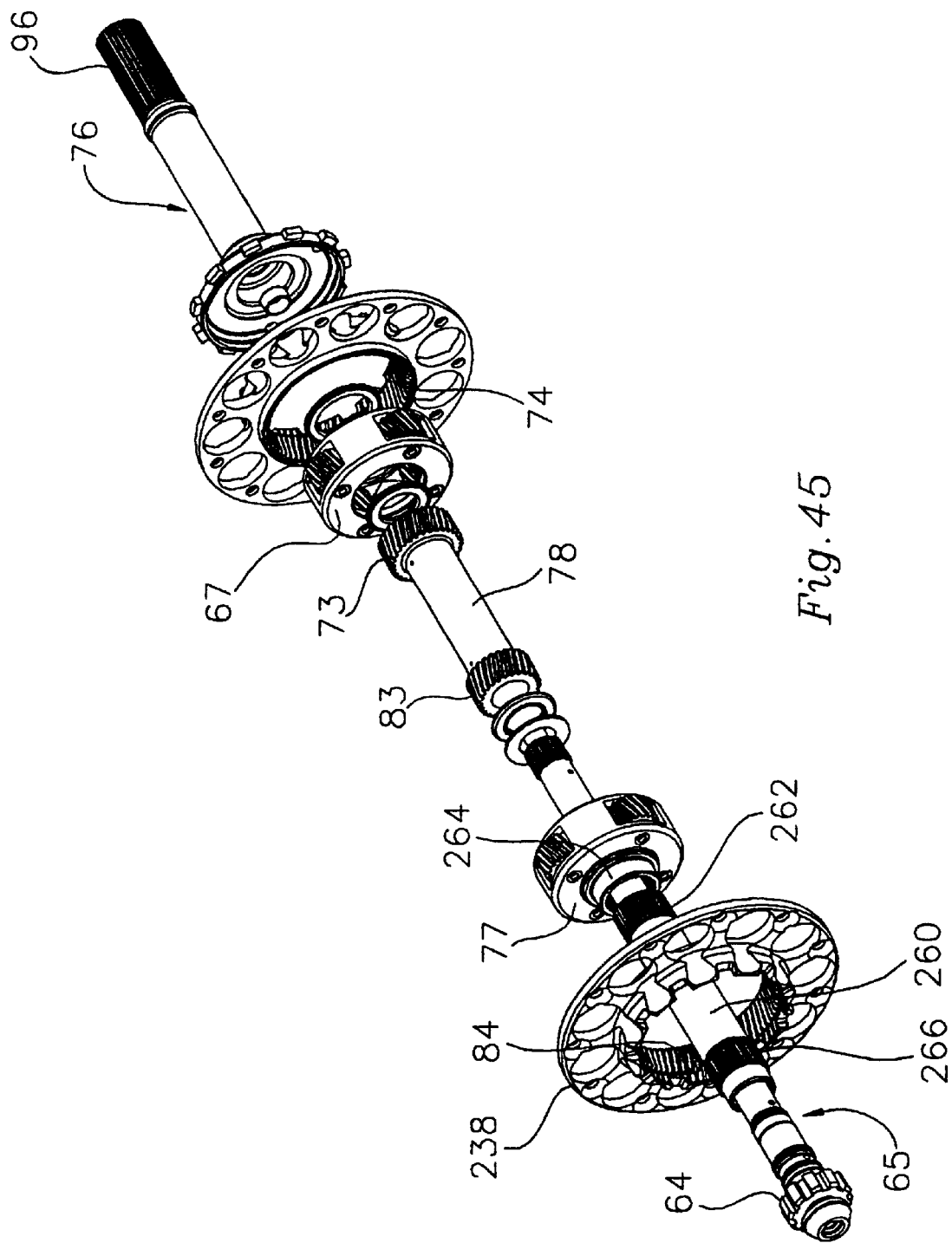
FIG. 45 is a perspective exploded view of the drive components shown in FIGS. 10–13.

As shown most clearly in FIGS. 45 and 46, a stator tube 260 for coupling the pump planet carrier 77 to the brake 85 includes an externally splined inner end 262 engaged with an internally splined tubular extension 264 on the pump planet carrier 77. The stator tube 260 surrounds the input shaft 65 and extends from the planet carrier 77 to an outer splined end 266 engaged with an internally splined ferrule 268 projecting inwardly from a brake flange 270. The brake flange 270 has an outer peripheral cylindrical flange 272 that is castellated or toothed on its outer radially facing surface to receive inwardly projecting radial teeth 274 of three clutch discs 276. The brake flange 270 and the clutch discs 276 lie concentrically within a brake ring 278 having an outer radial flange 280 that is fastened to the circular end closure 126 and has an axial cylindrical section 282 concentrically surrounding the cylindrical flange 272. The interior of the axial cylindrical section 282 is grooved or slotted to receive teeth 284 projecting radially outward from the outer end of a plurality of annular clutch plates 286 bracketing the clutch discs 276. A radial lip at the end of the axial cylindrical section 282 prevents the clutch discs 276 and plates 286 from being pushed out of the end of the axial cylindrical section 282. An annular brake piston 288 is seated in the annular cylinder 134 and is movable axially under influence of fluid admitted in the annular cylinder 134 behind the brake piston 288 to exert a precisely controlled axial force on the clutch plates 286 and the clutch discs 276 to transmit torque from the brake flange 270 to the brake ring 278 and thence to the housing. The fluid pressure released into the annular cylinder 134 for acting against the brake piston 288 is controlled by the brake modulation valve 97, which is a commercially available pulse modulated solenoid controlled fluid valve. In this way, the reaction torque transmitted from the pump planet carrier to ground, and hence the torque transmitted to the pump 50, is precisely controlled by the controller 100 through the brake modulation valve 97.

In operation, when the starter of the vehicle engine is energized, the brake 85 is released to allow the planet carrier 77 to spin freely, preventing torque from being transmitted to the pump. The starter motor has a much lighter load without having to rotate the pump and there is no chance that the vehicle could surge forward or backward because of an inadvertent adjustment of the pump displacement.

The rotating input shaft 65 rotates the make-up pump 75 and fluid pressure at make-up pressure is developed in the system. Pressurized fluid flows from the make-up pump 75 through a radial hole 280 in the input shaft 65 and through an axial hole 282 and then out through another radial hole 284 into an annular space 286 between the input shaft 65 and the stator tube 260. The fluid flows along the annular space 286 and lubricates a needle bearing between the planet carrier 77 and the sun gear 83, shown in FIG. 46. The fluid continues flowing along the annular space 286 and squirts up through a hole 290 to be deflected by an oil deflector 292 into an axial hole in a pinion shaft 294 on which the pump planet gears 82 are mounted for rotation on needle bearings 296. Those needle bearings 296 are lubricated by hydraulic fluid flowing from the axial holes and out radial holes in the pinion shaft 294. The motor planet gears are likewise lubricated by fluid flowing through radial and axial holes in the end of the input shaft 65 and into similar fluid flow passages in and around the bearings and gears inside the motor 60 as illustrated in FIGS. 10–13.

With system pressure now up to the pressure of the make-up pump, sufficient pressure is available to operate the control system. The control unit 100 sends a signal to the servomotor or stepper motor 110, mounted on a bracket 298 to move the control rod 199 and the spool valve 198 threaded onto the rod 199 to a zero displacement position from which forward or reverse acceleration can be commenced. The driver selects forward or reverse on the drive selector switch 118 and depresses the accelerator. The controller 100 senses the rate and extent of depression of the accelerator and adjusts the transmission accordingly by sending a signal to the stepper motor 110 to move the control rod and spool valve to a new position at the desire speed, while also adjusting the throttle to increase the engine speed to some designated speed of operation, preferably at a rate of increase and to an operating speed that will result in optimal efficiency and minimal emissions. The position of the spool valve 198 controls the position of a follower spool sleeve 200 which in turn controls the position of the pump control piston 194, using system pressure delivered to a larger cross-sectional area behind the step 299 in the piston 194. Both pump control piston and motor control piston 196 are biased toward the left in FIGS. 11–13 by fluid admitted into annular spaces between the pistons 194 and 196 through holes 300 and 302 from a constant source of fluid at system pressure admitted through openings 304 and 306 in the actuator cylinder block 189, and through check valves in those openings, so the pressure delivered to the control actuator 115 is always at system pressure even if the vehicle is running down hill and the motor is operating as a pump.

When more displacement of the pump is desired, the control rod 199 is pulled further to the right in FIGS. 11–13 and 49 to cause the pump control piston 194 to move to the right correspondingly. Eventually, the pump control piston will engage the end of the motor control piston 196 and the two control pistons 194 and 196 will move together toward the right through the continuously varying transmission ratio to the final ratio at hydraulic lock-up at which the motor is at zero displacement and the pump is at some large displacement.

Figure 55:
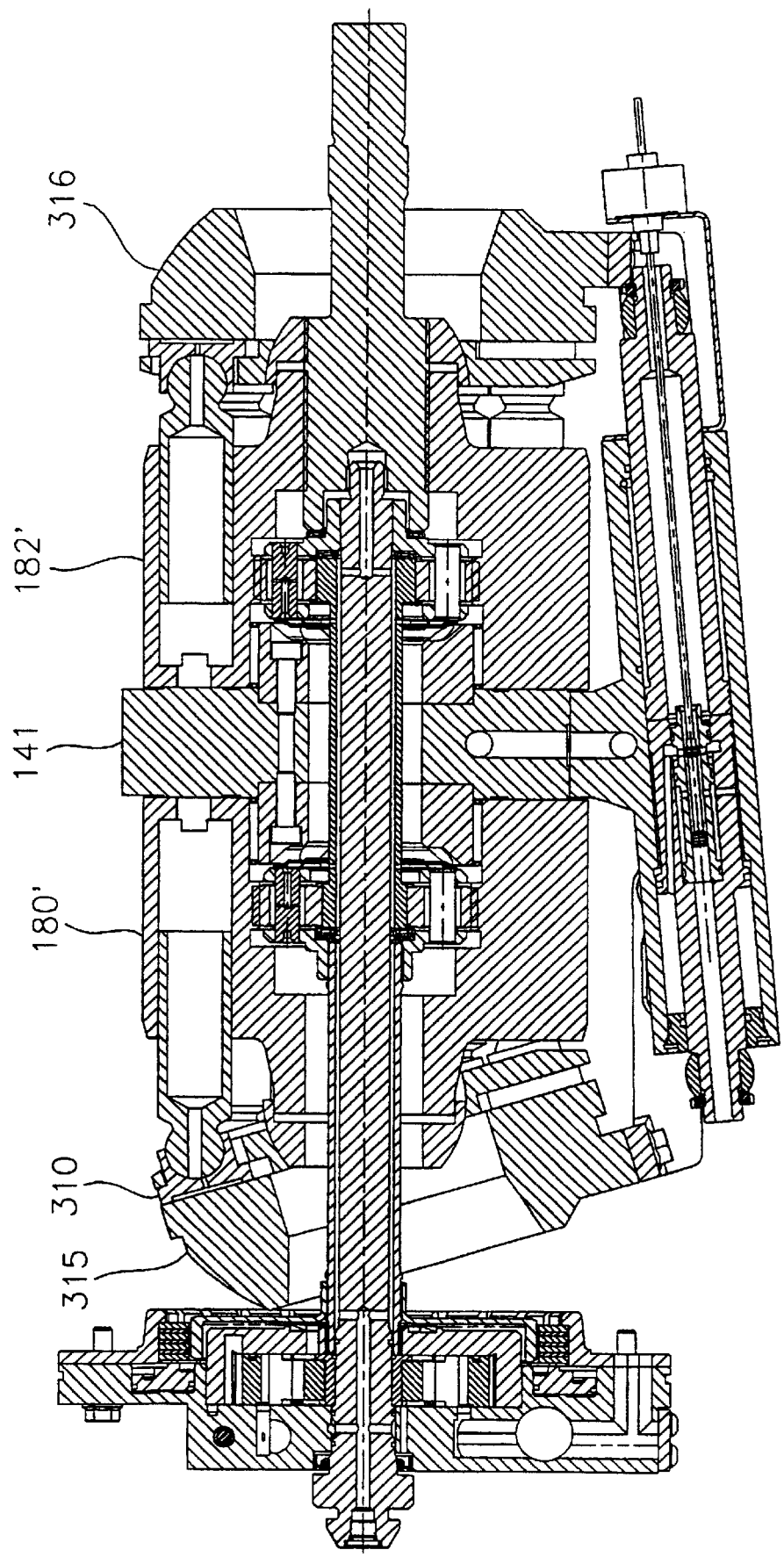
FIG. 55 is a sectional elevation of the embodiment shown in FIG. 54 on a vertical section plane through the longitudinal axis of the machine.

One of several variations of this invention that are made possible by its unique arrangement is the swashplate version shown in FIGS. 54 and 55. This version is identical in its structure and operation with the exception that the cylinder blocks do not tilt with the yokes, as in the embodiment of FIGS. 6–15, but instead the cylinder blocks 180' and 182' rotate flat against the manifold block 141. The pistons now face outward and the piston heads are captured in slippers 310 and bead against a flat face of a pump swashplate 315 and a motor swashplate 316. The swashplate angles are controlled by a control actuator 115 as in the prior embodiment. The swashplates 315 and 316 are mounted for swiveling on elongated links 320 as shown in FIG. 54.

The advantage of the swashplate design is that the housing can be made smaller because the excursion of the tilting swashplates is less that the corresponding excursion of the tilting yokes 151 and 152 and their cylinder blocks. The disadvantage of the swashplate design is that it tends to wear faster because of the lateral forces exerted by the pistons in the cylinders. The resulting frictional forces also result in somewhat higher internal losses, so swashplate hydrostatic units have a bit lower efficiency that the bent axis units used in the embodiment of FIGS. 6–15.

Thus, the preferred embodiment of the invention described above attains the objects enumerated above, and others. Notable among its many features and benefits are the following:

1. Actual neutral with zero displacement.
2. The clutch/brake 85 allows smooth starting without the usual jerkiness of a hydrostatic transmission by allowing controlled limited slipping. The brake modulation control 97 allows the brake 85 to be applied gradually for a soft and gentle "launch feel" or a sudden fast acceleration, or anything in between, by using the accelerator peddle position of rate of depression as an input to the pulse width solenoid on the brake modulation valve 97. Releasing the brake 85 allows easier starting of the engine because the inertial and fluid resistance is removed, thereby reducing the load on the starter.
3. The working fluid system can be pressurized with the brake 85 decoupled, using the make-up pump 75, so that any slip of the pump setting from zero displacement position won't cause unintended surges when engine is started.
4. If the engine 40 seizes, the output shaft 76 (and the vehicle wheels) can free-wheel by disengaging the brake 85 and stroking the motor 60 to zero displacement (for example, by valving the motor output to the pump modulation control valve 115, so it is pressurized toward the lock-up position.)
5. The axial load of the torque rings against the manifold block is proportional to pressure, so the sealing force increases as needed to contain the higher pressure.
6. Axial fluid pressure force is reacted internally through the links and is not carried by the housing, so the housing can be made light and economical. Torque on the yokes is reacted through the links instead of the housing. Loads are reacted internally, isolated from the housing, so loads on the housing are reduced; hydraulic ripple, hydraulic pressure pulses, are isolated from the housing, reducing noise, vibration and harshness.

7. A stepper motor controls the position of a leader/follower valve, whose position controls the position of the transmission ratio control pistons. The stepper motor is electrically controlled by a controller operating in accordance with control algorithms specific to the particular vehicle, using inputs selected by the vehicle manufacturer, such as throttle position, transmission drive selector switch, engine speed, vehicle speed, engine torque, load (as detected by a torque sensor on the output shaft), operator preference controls (e.g. "economy", "performance", etc.) and other inputs relevant to operation of a motor vehicle. The transmission is thus able to function in a wide variety of vehicles by adapting through the inputs and algorithms preferred by the vehicle designers.

8. A valve in the manifold block can be opened to dump pressure into a hydraulic accumulator or just to sump if the driver wants to coast down hill or to a stop light, so the motor doesn't stroke to full displacement and lock up the wheels.

9. Holding the vehicle on position on a hill without braking (e.g. while at a traffic light or when starting the engine) is made possible because the motor is at full displacement and the pump is at zero displacement, so the wheels would have to drive the motor to pump fluid, but there is no place for the fluid to go so the output shaft is locked.

10. Engine starting using fluid pressure stored, e.g. in an accumulator, is possible by setting the pump to maximum displacement and the motor to zero displacement, and opening a "starter valve" to apply fluid pressure to the suction side of the manifold and let the pressure side discharge to sump. This will drive the engine in the driving direction for starting similar to using a conventional starter motor. As soon as the engine starts, the input shaft speed increases and the brake/clutch is released to allow the engine to spin the input shaft without applying torque to the pump. The "starter valve" is reset to the drive position and normal driving operation is resumed.

11. The transmission can be operated as a fluid power source for hydraulic power applications such as remote hydraulic motors and hydraulic cylinders. The pump is set to maximum displacement and the motor to zero displacement. A power take-off valve (not shown) is opened to allow fluid to flow to and from the manifold through an external fluid circuit to the power application. The engine is operated to give the desired flow rate to operate the power application as long is it is needed, and then the power take-off valve and the transmission pump and motor are reset to normal driving position.

12. Pump and motor stroke control is simple and reliable because the yoke is attached to ground.

13. Fluid connections into the fluid circuit are easy and leak-free because they can be made in the manifold block, which is fixed to ground, so they don't have to pass through a rotating interface.

Obviously, numerous modifications and variations of the preferred embodiment described above are possible and will become apparent to those skilled in the art in light of this specification. For example, many functions and advantages are described for the preferred embodiment, but in many uses of the invention, not all of these functions and advantages would be needed. Therefore, we contemplate the use of the invention using fewer than the complete set of noted features, benefits, functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species.

Accordingly, it is expressly intended that all these embodiments, species, modifications and variations, and the equivalents thereof, are to be considered within the spirit and scope of the invention as defined in the following claims, wherein we claim:

1. A continuously variable transmission comprising:
   two hydraulic units including a pump and a motor, each having a rotational element and a grounded reaction element, at least one of said hydraulic units being variable displacement;
   a control system for controlling said displacement of said one hydraulic unit;
   a variable ratio motor gearset having first, second and third meshing gear elements, and a variable ratio pump gearset having first, second and third meshing gear elements;
   an input shaft connected to said first gear element of said motor gearset;
   an output shaft connected to said second gear element of said motor gearset and to said rotational element of said second hydraulic unit;
   said third gear element of said motor gearset being connected to said third gear element of said pump gearset;
   a brake releasably connecting said first element of said pump gearset to ground;
   said second gear element of said pump gearset being connected to said rotational element of said first hydraulic unit;
   said two hydraulic units being hydraulically connected such that the displaced fluid from the first hydraulic unit flows to the second hydraulic unit and vice versa;
   whereby, input torque applied to said input shaft is transmitted therethrough to said pump, when said brake is engaged, by way of said first and third elements of said variable ratio motor gearset and thence by way of said third, first and second elements of said variable ratio pump gearset, reacting through said engaged brake to ground, to rotate said pump and pressurize a working fluid in said pump cylinders; said transferring of said input torque from said input shaft to said pump creating a reaction torque which is transferred through said second element of said variable ratio pump gearset to said output shaft, said pressurized fluid being conveyed through said opening in said manifold block to said motor and energizing said motor to produce motor torque that is transferred to said output shaft in addition to said reaction torque as output torque in said output shaft.

2. A continuously variable transmission as defined in claim 1, wherein:
   said hydraulic units and said two variable gearsets are configured to give a desired final ratio, and to split said input torque into first and second parallel paths, said first parallel path being a direct mechanical path to the output shaft, and second parallel path being through said first and second hydraulic units;
   said second hydraulic unit and said first hydraulic unit having a ratio of displacements that multiplies torque through said second parallel path, thereby adding to torque transmitted through said first parallel path;

whereby, adjustment of said motor displacement to zero reduces torque multiplication from the hydraulic units to zero so they act only to react torque from the mechanical torque of said first parallel path and so all said input torque and energy passes directly through said motor gearset to said output shaft, and stroking said motor to maximum displacement and said pump to zero displacement places said transmission in a "holding neutral" setting for holding a vehicle in a stationary position, wherein said motor, and hence said output shaft, can not rotate in any direction as said pump can not accept any fluid discharged from said motor.

3. A continuously variable transmission as defined in claim 1, wherein:

stroking of variable displacement pump in either direction from said zero displacement position thereof changes direction of fluid flow from said pump to said motor and drives said motor and hence said output shaft in either forward or reverse direction;

whereby said transmission hydraulically multiplies torque in both forward and reverse, without having to change any gearing, as follows:

forward torque=input torque×[1/(1+(Sm/Rm))+A]

reverse torque=input torque×[1/(1+(Sm/Rm))−A], where A=1/(1+(Rm/Sm))×Rp/Sp×motor displacement/pump displacement).

4. A continuously variable transmission as defined in claim 1, further comprising:

control apparatus for stroking said motor to zero displacement and releasing said brake to disconnect said first element of said pump gearset from ground;

whereby, said releasing of said brake enables said output shaft to freely rotate in either direction, regardless of pump displacement or input speed, and said output shaft and power applications driven thereby are disconnected from said prime mover.

5. A continuously variable transmission as defined in claim 1, wherein:

said first element of said pump gearset is connected to ground by means of said releasable brake, and can be released to disengage said prime mover from the transmission when desired;

whereby disengagement of said brake at startup allows time for make-up pressure and lubrication to reach the hydromechanical units before they start rotating, and gradual engagement of said brake during start up, launch and driving, facilitates take off characteristics.

6. A continuously variable transmission as defined in claim 1, wherein:

said pump and motor hydraulic units are both variable displacement bent axis units, hydraulically connected in series through a stationary manifold block, through which hydraulic fluid passes from said pump to said motor, and vice versa;

said pump having pump cylinders containing pump pistons with piston heads fixed in a pump torque ring in contact through a hydraulic interface with one side of said stationary manifold block, said pistons having axially bored hollow piston rods through which said fluid pressurized in said pump passes from said pump and thence through said manifold block;

said motor having motor cylinders containing motor pistons with motor piston heads fixed in a motor torque ring in contact with a side of said manifold block opposite said one side through a hydraulic interface, said motor pistons having hollow piston rods through which fluid pressurized in said pump passes from said manifold block into cylinder bores of said motor to energized said motor and convert energy in said pressurized fluid to torque.

7. A continuously variable transmission as defined in claim 6, further comprising:

spherical bearings having a center of curvature lying on said pivotal axis of said yoke tubes and the hollow pistons;

said cylinder blocks of both of said hydraulic units are guided on inner axial ends thereof by said spherical bearings;

springs biased between said spherical bearings and said cylinder blocks for pre-loading said cylinder blocks against said yokes and for pre-loading said torque rings against said stationary manifold block;

whereby said spring pre-load provides an initial hydraulic seal at said hydraulic interfaces, as well as to overcome piston friction due to centrifugal loading of the pistons on the walls of the cylinder bores.

8. A continuously variable transmission as defined in claim 6, wherein:

said pump hollow pistons each include a hollow pump piston sleeve slidably disposed in said cylinder bores, said pump piston rods each having a spherical joint at one end, said spherical joint being fixed to said pump torque ring for articulation relative thereto during operation of said pump;

whereby said piston assembly is free to articulate as said cylinders rotate whilst maintaining a sufficient length of engagement and hydraulic sealing in said cylinder bore, and said hollow pistons pass fluid flow from said cylinder bores to said stationary manifold and vice-versa, free of substantial restriction, as well as reducing the weight of the piston assembly and thereby reducing piston friction due to centrifugal loading.

9. A continuously variable transmission as defined in claim 1, wherein:

said pump and motor hydraulic units are variable displacement bent axis units having rotating elements rotating about their own centers of mass;

whereby said rotating elements are inherently balanced and can be rotated at high rotational velocity and therefore at high power levels.

10. A continuously variable transmission as defined in claim 1, wherein:

both of said hydraulic units are variable displacement have cylinder blocks supported by yokes that are linked to each other;

whereby all internal separating loads are resolved internally through said yokes and linking structure, bypassing said housing.

11. A continuously variable transmission as defined in claim 1, further comprising:

balance pucks between said cylinder blocks and said yokes and having hydrostatic bearings at an interface between said pucks and said yoke for supporting said cylinder blocks of both hydraulic units on said yokes; and said balance pucks being axially movable relative to said cylinders to accommodate some deflection of said yoke;

whereby said balance pucks move axially in the event of yoke deflection whilst said balance pucks remain substantially flat against said yoke to maintain integrity of said hydrostatic bearing.

12. A continuously variable transmission as defined in claim 1, wherein said control system comprises:

a motor control piston movable in a control cylinder between positions corresponding to zero displacement and maximum displacement of said motor;

a pump control piston movable in a pump control cylinder between positions corresponding to maximum displacement in reverse, through zero displacement, and maximum displacement in forward, said pump control piston having a back face, disposed in fluid engaging orientation in said pump control cylinder;

control links between said motor control piston and said motor yoke for controlling the displacement of said motor by controlling said position of said motor control piston, and control links between said pump control piston and said pump yoke for controlling the displacement of said pump by controlling said position of said pump control piston;

a motor piston biasing force acting on said motor piston to bias said motor yoke toward a maximum tilt position thereof, wherein said motor displacement is at a maximum;

a pump piston biasing force acting on said pump control piston to bias said pump yoke toward said maximum displacement of said pump in reverse;

a modulating valve through which system pressure is tapped off from said manifold and is fed through to said back face of said pump control piston for controlling said pump piston position;

whereby system pressure admitted by said modulating valve into said pump control cylinder and acting on said back face of said pump control piston generates a pressure force that overcomes said pump piston biasing force and said motor piston biasing force to cause said pump to stroke toward said maximum displacement thereof in the forward direction to a position determined by said modulating valve.

13. A continuously variable transmission as defined in claim 12, wherein:

said motor piston biasing force and said pump piston biasing force are hydraulic forces exerted by transmission fluid at system pressure admitted to said pump control cylinder and said motor control cylinder and applied against front faces of said pump and motor control pistons.

14. A continuously variable transmission as defined in claim 12, wherein:

said biasing force is exerted by system pressure delivered to said piston faces via internal passages in said manifold block; for conveying system pressure to said back surface of said motor control piston for pressurizing said motor control cylinder and exerting a pressure force against said back face of said motor control piston with system pressure, said system pressure acting on said motor piston back area to bias said motor yoke toward a maximum tilt position thereof, wherein said motor displacement is at a maximum;

fluid passages from said shuttle valve to said pump control cylinder for conveying system pressure an annular area of said pump control piston, which is equal in area of said back face area of said motor control piston to bias said pump piston toward said maximum displacement of said pump in reverse.

15. A continuously variable transmission as defined in claim 1, further comprising:

a scavenge pump connected to said input shaft and housed in a stationary housing closure plate, said scavenge pump supplying low pressure fluid to said hydraulic units to resupply fluid lost by leakage from the fluid circuit as well as provide fluid flow through a lubrication/cooling circuit and provide fluid pressure for said brake.

16. A continuously variable transmission as defined in claim 1, further comprising:

stationary taps in said stationary manifold for tapping off system pressure from said manifold block through a stationary fluid connection.

17. A method of operating a continuously variable transmission, comprising:

applying input torque to an input shaft and transmitting said input torque through said input shaft to a pump by way of first and third elements of a first variable ratio motor gearset and thence by way of third, first and second elements of a second variable ratio pump gearset to rotate said pump and pressurize a working fluid in cylinders in said pump;

said transferring of said input torque from said input shaft to said pump creating a reaction torque which is transferred through said second element of said variable ratio pump gearset to said output shaft, said pressurized fluid being conveyed through openings in a stationary manifold block between said pump cylinder block and a cylinder block of a motor, said fluid energizing said motor to produce motor torque that is transferred to said output shaft in addition to said reaction torque as output torque in said output shaft.

18. A method of operating a continuously variable transmission as defined in claim 17, further comprising:

supporting a rotating cylinder block of said pump for rotation on a grounded tilting pump yoke, and supporting a rotating cylinder block of said motor for rotation on a grounded tilting motor yoke;

controlling the transmission ratio of said transmission by controlling the tilt angles between said rotating cylinder block of said pump and a grounded manifold, and by controlling the angle between said rotating motor cylinder block and said manifold block;

controlling said pump and motor cylinder block angles by controlling the tilt angle of said grounded swiveling yokes supporting said cylinder blocks, thereby controlling the angle of said cylinder blocks relative to an intermediate stationary manifold block.

19. A method of operating a continuously variable transmission as defined in claim 18, wherein said tilt angle control step includes:

applying a biasing force to pump and motor control pistons in a control cylinder to bias said control pistons in one direction;

applying a fluid force through a modulating valve to said pistons in the opposite direction from said biasing force to overcome said biasing force and move said pistons to selected positions to achieve desired tilt angles of said pump and motor yokes;

whereby a single modulating valve controls both the pump and motor from neutral through final drive and into reverse, thus reducing cost and complexity of the control system.

20. A method of operating a continuously variable transmission as defined in claim 17, further comprising:

reacting said input torque through a brake to ground when said brake is engaged;

disengaging said brake when said input torque is to be decoupled from said pump, thereby allowing said third and first elements of said second variable ratio pump gearset to spin freely without transmitting torque to said second element of said second variable ratio pump gearset or said pump.

21. A continuously variable transmission, comprising:

an operating assembly including a pump unit and a motor unit hydraulically related to each other through a stationary manifold and mechanically related through a planetary gear set;

an input shaft driving a planet carrier in which are mounted planet gears engaged with a sun gear and a ring gear of said planet gear set;

an output shaft driven by said ring gear;

said pump having a pump cylinder block operatively driven in rotation by said sun gear of said planetary gear set;

a housing enclosing said operating assembly;

a stationary actuator fixed to said housing and linked to at least one of said hydrostatic units for adjusting the displacement of said one of said hydrostatic units;

two yokes mounted in said housing for tilting about pivotal axes perpendicular to said input shaft, one of said yokes having a surface for slidably engaging an element of said pump as said pump rotates, and the other of said yokes having a surface for slidably engaging an element of said motor as said motor rotates;

links connecting said yokes to directly resolve separating forces exerted by internal fluid pressure in said pump and said motor;

said pump and said motor are both bent axis units having rotating cylinder blocks supported by said yokes;

whereby said cylinder blocks tilt with said yokes and rotate in a balanced manner about their own centers of mass regardless of the angle of tilt of said yokes.

22. A continuously variable transmission as defined in claim 21, further comprising:

a hydrostatic bearing between said pump element and said pump yoke, and a hydrostatic bearing between said motor element and said motor yoke, said hydrostatic bearing using operating fluid of said transmission at system pressure to compensate for changes in axial force exerted by said pump and motor elements against said pump and motor yokes at different vehicle operating conditions.

23. A continuously variable transmission as defined in claim 21, further comprising:

two spherical bearings, each having a center of curvature coinciding with said pivotal axis of a respective one of said pump and motor yokes, for guiding said cylinder blocks are on their inner axial ends when said tilt angle of said yokes change.

24. A continuously variable transmission as defined in claim 21, further comprising:

a scavenge pump driven by said input shaft and connected to said manifold solely through static fluid interfaces for supplying fluid under low pressure to resupply fluid lost by leakage from the fluid circuit.

25. A transmission mechanism, comprising:

first and second hydraulic units coupled together hydraulically such that fluid displaced from one unit flows into the other unit, and vice versa, said units each having a rotational element and a reaction element, at least one of said hydraulic units being of the variable displacement type;

said reaction elements of both hydraulic units being connected to ground;

a variable ratio gearset having at least first, second and third gear elements related together by meshing gear teeth;

an input shaft mechanically coupled to said first gear element;

an output shaft mechanically coupled to said second gear element;

said rotational element of said first hydraulic unit mechanically coupled to said third gear element; and said rotational element of said second hydraulic unit being connected to said output shaft.

26. A process for converting rotating input power in an input shaft at an input speed and torque to rotating output power in an output shaft at a variable output speed and torque, comprising:

applying input torque to said input shaft;

transmitting said input torque through said input shaft to a pump via first and third gear elements of a variable ratio gearset to rotate said pump and pressurize a working fluid in said pump cylinders, transfer of said input torque from said input shaft to said pump creating a reaction torque which is transferred through said second element of said planetary gearset to said output shaft, said pressurized fluid being conveyed from said pump cylinders through said pump piston bores and through said opening in said manifold block and through said motor piston bores to said motor cylinders to energize said motor to produce motor torque that is transferred to said output shaft in addition to said reaction torque as output torque in said output shaft.

27. A continuously variable transmission, comprising:

an operating assembly including first and second hydraulic units coupled together hydraulically such that fluid displaced from one unit flows into the other unit, and vice versa, said units each having a rotational element and a reaction element, at least one of said hydraulic units being of the variable displacement type;

said reaction elements of both hydraulic units being connected to ground;

a variable ratio gearset having at least first, second and third gear elements related together by meshing gear teeth;

an input shaft mechanically coupled to said first gear element;

an output shaft mechanically coupled to said second gear element;

said rotational element of said first hydraulic unit mechanically coupled to said third gear element;

said input shaft and said variable ratio gearset comprising an input drive train to said rotational element of said first hydraulic unit;

said rotational element of said second hydraulic unit being connected to said output shaft;

a clutch interposed in said input drive train for selectively decoupling said first hydraulic unit from said input shaft to allow said transmission to free-wheel when said clutch is operated.

28. A continuously variable transmission, comprising:

a fixed housing;

an input shaft having a longitudinal axis about which said input shaft rotates relative to said housing;

an output shaft having a longitudinal axis about which said output shaft rotates relative to said housing;

a pump having a rotating element and a reaction element, said pump rotating element including a pump cylinder block having pump cylinders opening in an axial face of said pump cylinder block, said pump rotating element having an axially facing surface engaged with said reaction element;

said pump reaction element including an input yoke mounted in said housing, fixed against rotation about said input shaft longitudinal axis and free to tilt under control of a yoke tilt actuator about an input yoke tilt axis that is perpendicular to and intersecting said input shaft axis, said input yoke having a surface facing inwardly toward and in load-bearing relation to said outwardly facing surface of said pump element;

a motor having a rotating element and a reaction element, said rotating element including a motor cylinder block having motor cylinders opening in an axial face of said motor cylinder block, said motor rotating element having an axially facing surface engaged with an inwardly facing surface of an output yoke;

said output yoke being mounted in said housing for tilting movement about an output yoke tilt axis that is perpendicular to and intersecting said output shaft axis, said inwardly facing surface of said output yoke being in load bearing relation to said outwardly facing surface said motor rotating element;

a manifold block fixedly mounted centrally in said housing and having flat axially outwardly facing surfaces on opposite input and output sides of said manifold block;

a pair of opposed curved recesses on each of said outwardly facing surfaces of said manifold block and at least one opening in each of said curved recesses extending axially completely through said manifold block so as to provide fluid flow from each curved recess to a corresponding curved recess on the opposite side of said manifold block;

said pump including an input torque ring having a ring of sockets for receiving piston heads of said pump pistons, and having a contact surface in contact with a flat, non-rotating flat surface;

motor pistons in said motor cylinders, through-bored for fluid transmission, and extending outwardly from said motor cylinders into torque transmitting engagement with an output torque ring of said motor;

said motor output torque ring having a ring of sockets for receiving piston heads of said motor pistons, and having a contact surface in contact with a flat output side surface of said manifold block and in torque transmitting engagement with said output shaft;

pump pistons in said pump cylinders, through-bored for fluid transmission, and extending outwardly from said pump cylinders into torque transmitting engagement with said pump torque ring;

a planetary gear set having a sun gear element, a ring gear element, and an intermediate planet carrier element holding a plurality of planet gears engaged between said ring gear element and said sun gear element, a first of said elements being in torque transmitting engagement with said input shaft, a third of said elements being in torque transmitting engagement with said pump, and a second of said elements being in torque transmitting engagement with said output shaft;

whereby, input torque applied to said input shaft is transmitted therethrough to said pump via said first and third gear elements to rotate said pump and pressurize a working fluid in said pump cylinders, transfer of said input torque from said input shaft to said pump creating a reaction torque which is transferred through said second element of said planetary gearset to said output shaft, said pressurized fluid being conveyed from said pump cylinders through said pump piston bores and through said opening in said manifold block and through said motor piston bores to said motor cylinders to energize said motor to produce motor torque that is transferred to said output shaft in addition to said reaction torque as output torque in said output shaft.

29. A continuously variable transmission as defined in claim 28, wherein;

said manifold block has a central bore extending completely therethrough and said input shaft extends through said central bore from said input end to said pump.

30. A continuously variable transmission as defined in claim 28, further comprising;

a brake interposed in the torque path between said input shaft and said pump and releasably coupling torque transmitted through said input shaft to said pump.

31. A continuously variable transmission as defined in claim 30, wherein;

said brake includes a reaction torque path between said housing and ground pad having a splined ring fixed to said housing and a rotating pad torsionally coupled to said ground pad.

* * * * *